US012237607B2

(12) United States Patent
Kobayashi et al.

(10) Patent No.: US 12,237,607 B2
(45) Date of Patent: Feb. 25, 2025

(54) JOINT CONNECTOR INCLUDING BRANCH PORTIONS AND COUPLING PORTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroki Kobayashi, Mie (JP); Hajime Kawase, Mie (JP); Masaaki Tabata, Mie (JP); Teruo Hara, Mie (JP); Hajime Matsui, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 364 days.

(21) Appl. No.: 17/767,029

(22) PCT Filed: Aug. 18, 2020

(86) PCT No.: PCT/JP2020/031060
§ 371 (c)(1),
(2) Date: Apr. 6, 2022

(87) PCT Pub. No.: WO2021/079596
PCT Pub. Date: Apr. 29, 2021

(65) Prior Publication Data

US 2022/0368056 A1 Nov. 17, 2022

(30) Foreign Application Priority Data

Oct. 24, 2019 (JP) ................................ 2019-193602

(51) Int. Cl.
*H01R 13/42* (2006.01)
*H01R 4/18* (2006.01)
(Continued)

(52) U.S. Cl.
CPC ............... *H01R 13/42* (2013.01); *H01R 4/18* (2013.01); *H01R 13/28* (2013.01); *H01R 13/506* (2013.01)

(58) Field of Classification Search
CPC ...... H01R 13/28; H01R 13/42; H01R 13/424; H01R 13/4361; H01R 13/506; H01R 4/18; H01R 4/185; H01R 43/20
See application file for complete search history.

(56) References Cited

U.S. PATENT DOCUMENTS 4,274,700 A * 6/1981 Keglewitsch .......... H01R 4/028 439/682
6,319,071 B1 * 11/2001 Sato ....................... H01R 4/185 439/701
(Continued)

FOREIGN PATENT DOCUMENTS

JP H07-073938 A 3/1995
JP 2000-306645 A 11/2000
JP 2001-135368 A 5/2001

OTHER PUBLICATIONS

International Search Report issued on Nov. 2, 2020 for WO 2021/079596 A1 (4 pages).

*Primary Examiner* — Abdullah A Riyami
*Assistant Examiner* — Thang H Nguyen
(74) *Attorney, Agent, or Firm* — Venjuris, P.C.

(57) ABSTRACT

A joint connector 10 for electrically connecting a plurality of wires 11 includes a housing 29 and a joint terminal 12 to be disposed in the housing 29. The joint terminal 12 includes a plurality of branch portions 20 arranged along an arrangement direction, a plurality of wire connecting portions 17
(Continued)

respectively continuous with the plurality of branch portions 20 and to be connected to the plurality of wires 11, and a coupling portion 19 for electrically connecting the plurality of branch portions 20 by coupling the plurality of branch portions 20. The coupling portion 19 is in the form of a plate extending in the arrangement direction and is bent. The coupling portion 19 is engaged with the housing 29.

9 Claims, 20 Drawing Sheets

(51) Int. Cl.

| | |
|---|---|
| ***H01R 13/18*** | (2006.01) |
| ***H01R 13/28*** | (2006.01) |
| ***H01R 13/506*** | (2006.01) |

(56) References Cited

U.S. PATENT DOCUMENTS

| | | | | |
|---|---|---|---|---|
| 7,125,285 | B2 * | 10/2006 | Maejima | H01R 12/523 439/82 |
| 8,337,251 | B2 * | 12/2012 | Ecker | H01R 31/08 439/620.27 |
| 9,246,259 | B2 * | 1/2016 | Sakamoto | H01R 13/4226 |
| 10,944,187 | B2 * | 3/2021 | Takeuchi | H01R 4/188 |
| 11,228,152 | B2 * | 1/2022 | Miyamura | H01R 31/06 |
| 2005/0191912 | A1 * | 9/2005 | Maeda | H01R 43/16 439/843 |
| 2010/0203756 | A1 * | 8/2010 | Omori | H01R 31/08 439/507 |
| 2014/0349524 | A1 * | 11/2014 | Sakamoto | H01R 31/08 439/701 |
| 2017/0345531 | A1 * | 11/2017 | Matsui | H01R 31/08 |
| 2019/0252803 | A1 * | 8/2019 | Takeuchi | H01R 13/424 |

* cited by examiner

JOINT CONNECTOR INCLUDING BRANCH PORTIONS AND COUPLING PORTION

CROSS REFERENCE TO RELATED APPLICATIONS

This application is a national phase of PCT application No. PCT/JP2020/031060, filed on 18 Aug. 2020, which claims priority from Japanese patent application No. 2019-193602, filed on 24 Oct. 2019, all of which are incorporated herein by reference.

TECHNICAL FIELD

The present disclosure relates to a joint connector.

BACKGROUND

A joint connector is known from Japanese Patent Laid-Open Publication No. H07-073938. This joint connector includes a housing and a joint terminal in which a plurality of tab-like contact portions are coupled. The joint terminal is press-fit into a terminal mounting groove portion provided in the housing.

PRIOR ART DOCUMENT

Patent Document

Patent Document 1: JP H07-073938 A

SUMMARY OF THE INVENTION

Problems to be Solved

In the joint connector according to the above technique, since the joint terminal is press-fit into the housing, there has been a problem that the efficiency of an assembling operation of the joint terminal and the housing is reduced.

The present disclosure was completed on the basis of the above situation and aims to provide a joint connector with improved efficiency of an assembling operation.

Means to Solve the Problem

The present disclosure is directed to a joint connector for electrically connecting a plurality of wires, the joint connector including a housing and a joint terminal to be disposed in the housing, wherein the joint terminal includes a plurality of branch portions arranged along an arrangement direction, a plurality of wire connecting portions respectively continuous with the plurality of branch portions and to be connected to the plurality of wires, and a coupling portion for electrically connecting the plurality of branch portions by coupling the plurality of branch portions, the coupling portion is in the form of a plate extending in the arrangement direction and is bent, and the coupling portion is engaged with the housing.

Effect of the Invention

According to the present disclosure, it is possible to improve the efficiency of an assembling operation of a joint connector.

DETAILED DESCRIPTION TO EXECUTE THE INVENTION

Description of Embodiments of Present Disclosure

Figure 1:
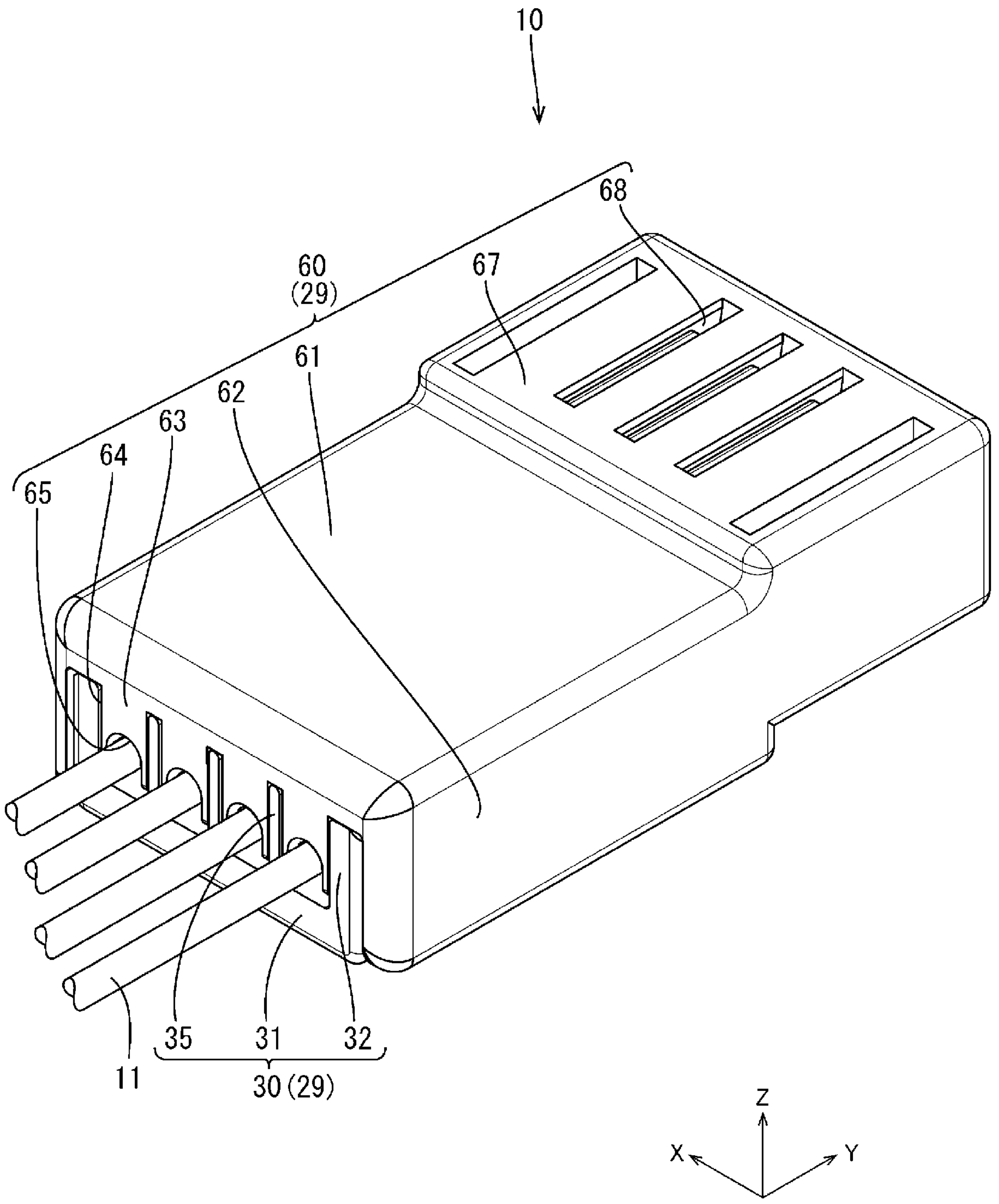
FIG. 1 is a perspective view showing a joint connector according to a first embodiment.

First, embodiments of the present disclosure are listed and described.

(1) The present disclosure is preferably directed to a joint connector for electrically connecting a plurality of wires, the joint connector including a housing and a joint terminal to be disposed in the housing, wherein the joint terminal includes a plurality of branch portions arranged along an arrangement direction, a plurality of wire connecting portions respectively continuous with the plurality of branch portions and to be connected to the plurality of wires, and a coupling portion for electrically connecting the plurality of branch portions by coupling the plurality of branch portions, the coupling portion is in the form of a plate extending in the arrangement direction and is bent, and the coupling portion is engaged with the housing.

The joint terminal can be easily mounted into the housing by engaging the bent coupling portion with the housing. In this way, the efficiency of an assembling operation of the joint terminal and the housing can be improved as compared to the case where the joint terminal is press-fit into the housing. Thus, the efficiency of an assembling operation of the joint connector can be improved.

(2) Preferably, the coupling portion includes a plurality of bent portions bent to project from a plate surface of the coupling portion, the plurality of bent portions include at least one pitch adjusting bent portion, and the pitch adjusting bent portion has a bent shape different from those of the other bent portions.

By making the bent shape of the pitch adjusting bent portion different from those of the other bent portions, pitch intervals between adjacent ones of the plurality of wire connecting portions can be adjusted.

(3) Preferably, end engaging portions to be engaged with the housing are provided on both end parts of the coupling portion in the arrangement direction.

According to the above configuration, the joint terminal can be mounted into the housing by a simple method of engaging the end engaging portions provided on the both end parts of the coupling portion with the housing with the coupling portion stretched in the arrangement direction to generate a resilient force.

(4) Preferably, the coupling portion includes a plurality of bent portions bent to project from a plate surface of the coupling portion, and the housing includes a plurality of individual engaging portions to be respectively resiliently engaged with the plurality of bent portions.

By respectively engaging the bent portions provided in the coupling portion and the individual engaging portions provided in the housing, the positions of the plurality of bent portions in the arrangement direction can be individually adjusted. In this way, the accuracy of the pitch intervals between adjacent ones of the plurality of wire connecting portions can be improved.

(5) Preferably, each of the plurality of wire connecting portions includes a terminal body having a plurality of sandwiching pieces for sandwiching the wire and a slide portion slidable with respect to the terminal body along an extending direction of the wire, the slide portion has a tubular shape and the plurality of sandwiching pieces are accommodated inside the slide portion, the slide portion includes a contact portion projecting inward from an inner wall of the slide portion and configured to press the plurality of sandwiching pieces toward the wire by coming into contact with the plurality of sandwiching pieces, and the contact portion comes into contact with the plurality of sandwiching pieces when the slide portion moves to a contact position.

According to the above configuration, the sandwiching pieces are pressed toward the wire by the contact portion by sliding the slide portion to the contact position. In this way, the wire and the wire connecting portion can be electrically connected via the sandwiching pieces.

(6) Preferably, the terminal body includes an intersecting wall portion intersecting a sliding direction of the slide portion to the contact position on a front end part in the sliding direction.

When the slide portion is slid in the sliding direction, the sandwiching pieces are pushed forward in the sliding direction by the slide portion. At this time, a forward movement of the terminal body in the sliding direction can be suppressed by disposing a pressing jig in front of the intersecting wall portion and bringing this pressing jig into contact with the intersecting wall portion from front. In this way, a forward positional deviation of the terminal body in the sliding direction can be suppressed when the slide portion is slid to the contact position.

(7) Preferably, each of the plurality of wire connecting portions includes a crimping portion to be crimped to the wire.

The joint terminal and the wire can be connected by a simple method called crimping.

Details of Embodiments of Present Disclosure

Hereinafter, embodiments of the present disclosure are described. The present disclosure is not limited to these illustrations and is intended to be represented by claims and include all changes in the scope of claims and in the meaning and scope of equivalents.

First Embodiment

A first embodiment of the present disclosure is described with reference to FIGS. 1 to 11. A joint connector 10 according to this embodiment electrically connects a plurality of wires 11. In the following description, a direction indicated by an arrow Z is referred to as an upward direction, a direction indicated by an arrow Y is referred to as a forward direction, and a direction indicated by an arrow X is referred to as a leftward direction. Note that, for a plurality of identical members, only some members may be denoted by a reference sign and the other members may not be denoted by the reference sign.

[Joint Connector 10]

Figure 2:
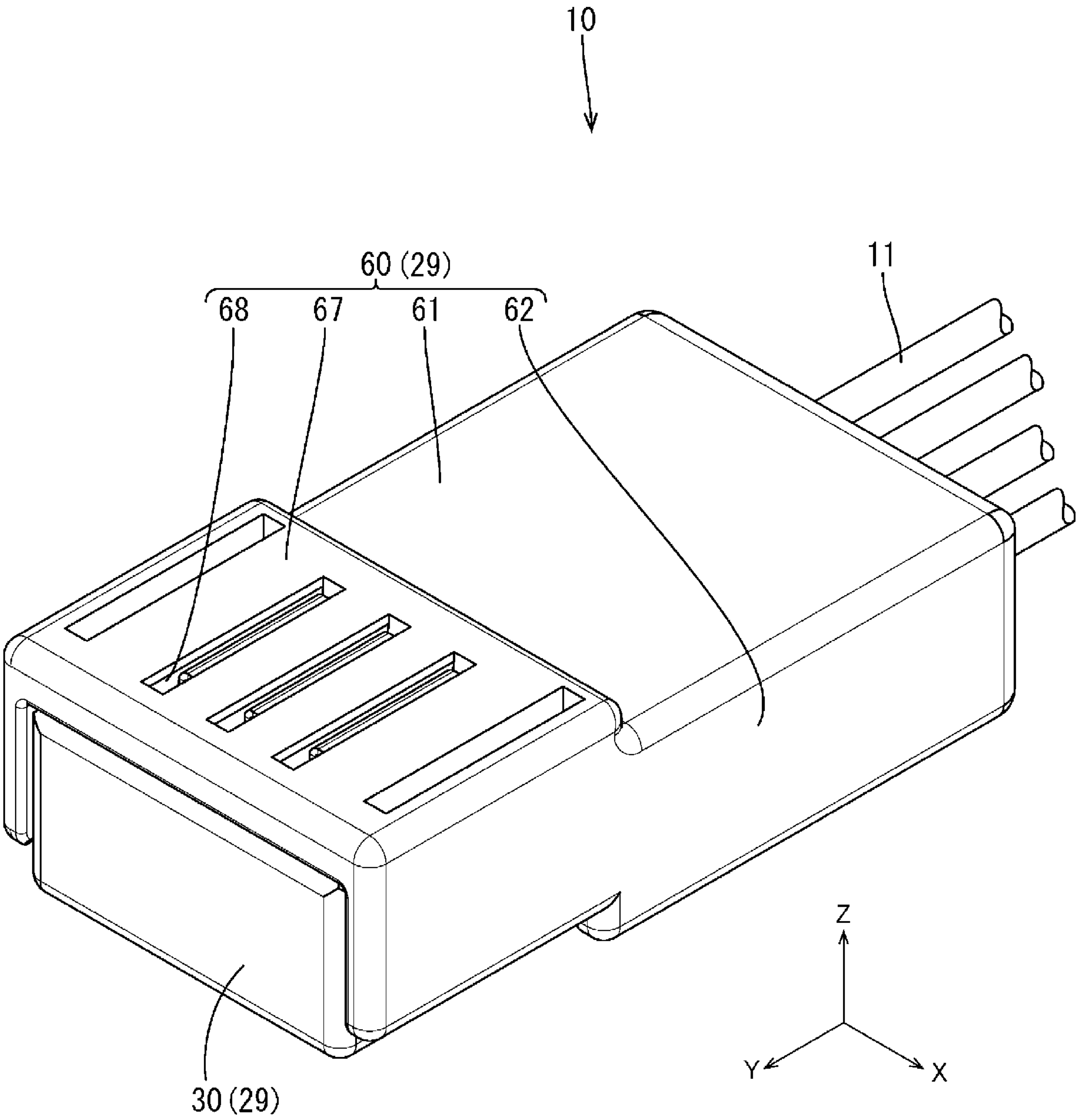
FIG. 2 is a perspective view showing the joint connector viewed from a direction different from that in FIG. 1.
Figure 3:
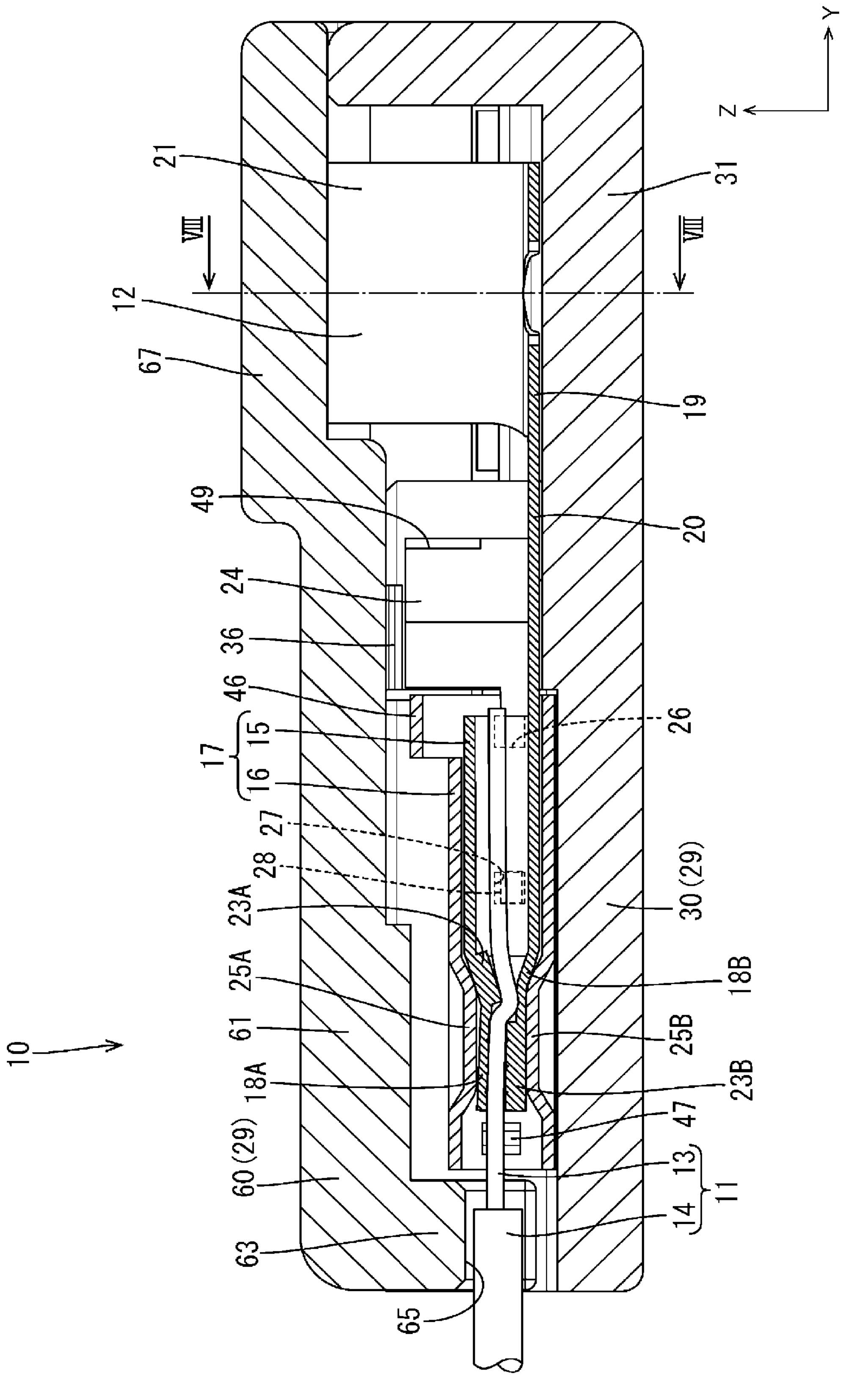
FIG. 3 is a side view in section showing the joint connector.
Figure 4:
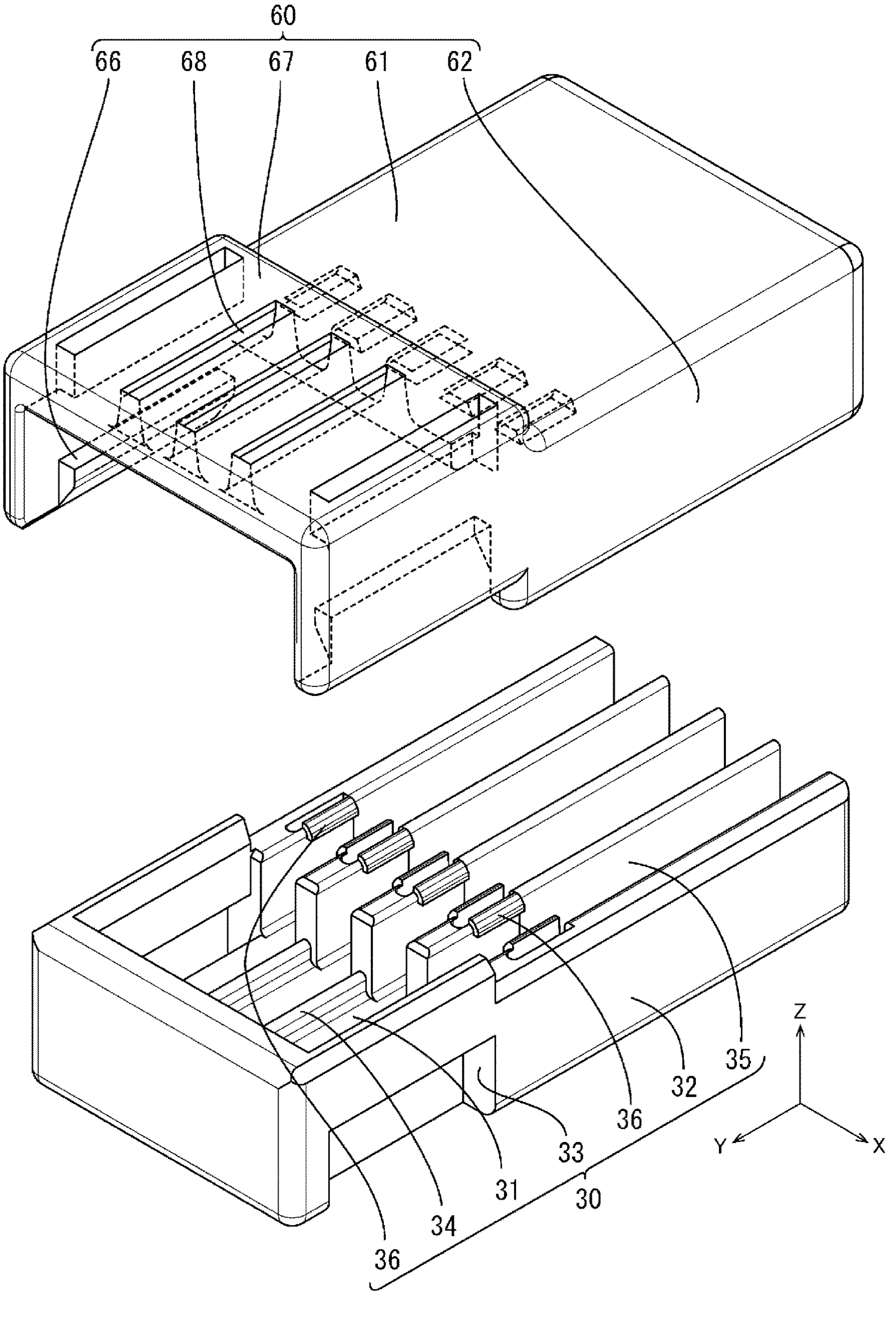
FIG. 4 is an exploded perspective view showing a lower housing and an upper housing.

As shown in FIGS. 1 and 2, the joint connector 10 is substantially in the form of a rectangular parallelepiped extending in a front-rear direction. As shown in FIG. 3, the joint connector 10 according to this embodiment includes a housing 29 and a joint terminal 12 to be disposed in the housing 29. As shown in FIG. 4, the housing 29 includes a lower housing 30 and an upper housing 60 to be mounted atop the lower housing 30. The wires 11 are routed to extend substantially in the front-rear direction and the front-rear direction is an extending direction of the wires 11.

As shown in FIG. 3, the plurality of wires 11 are disposed to extend in the front-rear direction. The wire 11 is configured such that the outer periphery of a core 13 is surrounded with an insulation coating 14 made of insulating synthetic resin. The core 13 according to this embodiment is formed of one metal wire. Note that the core 13 may be a stranded wire formed by twisting a plurality of metal strands. An arbitrary metal such as copper, copper alloy, aluminum and aluminum alloy can be appropriately selected as a metal constituting the core 13 if necessary. The core 13 according to this embodiment is made of copper or copper alloy.

[Lower Housing 30]

As shown in FIG. 4, the lower housing 30 is shaped to extend in the front-rear direction and be flat in a vertical direction. The lower housing 30 is formed by injection molding an insulating synthetic resin. The lower housing 30 includes a bottom wall 31, side walls 32 extending upward from both left and right side edges of the bottom wall 31 and a front wall extending upward from the front end edge of the bottom wall 31.

As shown in FIG. 4, a plurality of (four in this embodiment) partition ribs 34 extending rearward from a front end part of the bottom wall 31 are formed at intervals in a lateral direction on the bottom wall 31 of the lower housing 30. A length in the front-rear direction of the partition rib 34 is set to be substantially one third of a length in the front-rear direction of the bottom wall 31.

A plurality of (four in this embodiment) partition walls 35 extending rearward from rear end parts of the respective partition ribs 34 are formed on the bottom wall 31 of the lower housing 30. The partition walls 35 extend up to a rear end part of the bottom wall 31.

Figure 5:
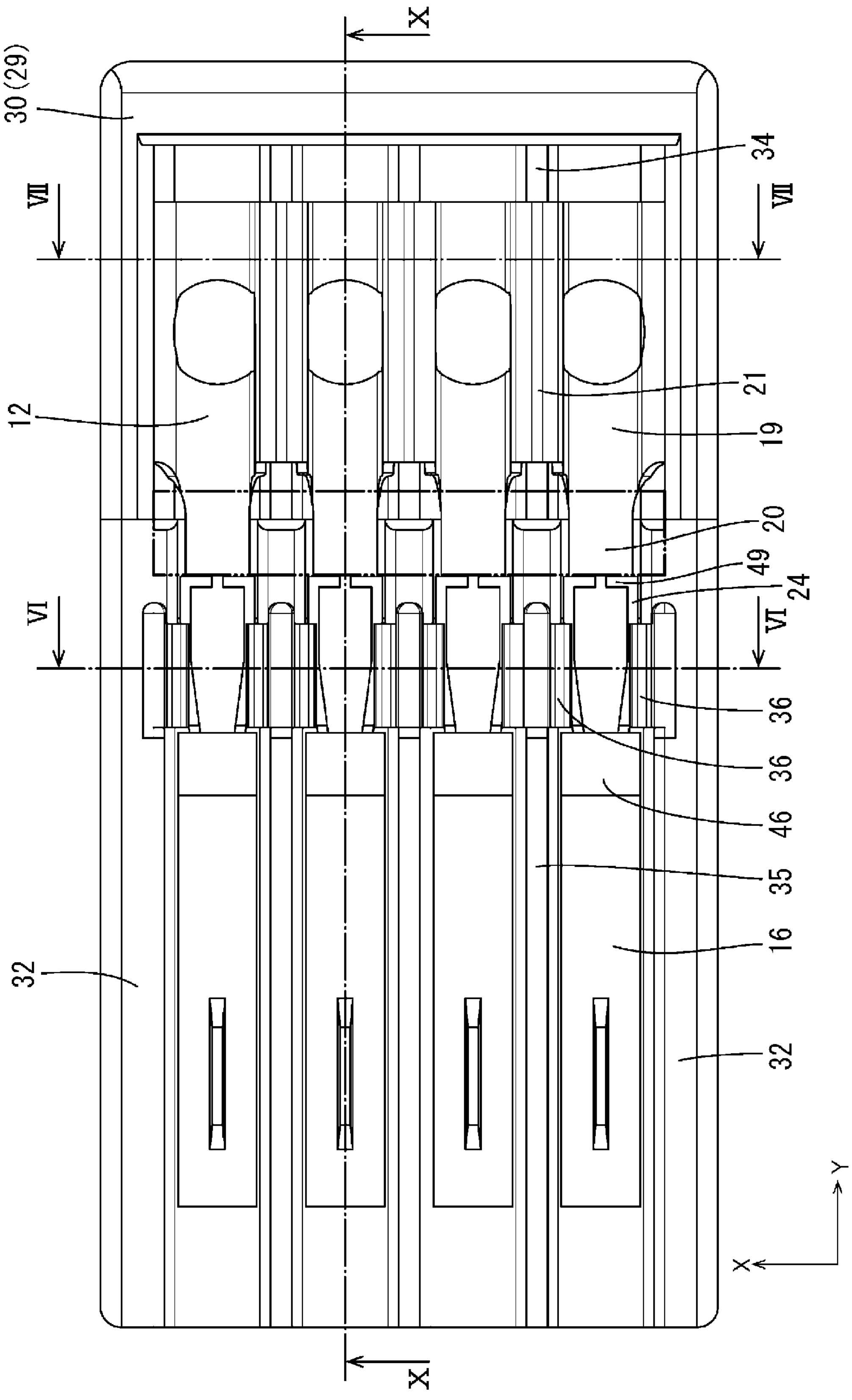
FIG. 5 is a plan view showing the joint connector in a state before the upper housing is assembled.

As shown in FIG. 5, wire connecting portions 17 of the joint terminal 12 are arranged from above into spaces partitioned by the side walls 32 and the partition walls 35 of the lower housing 30. A coupling portion 19 of the joint terminal 12 is accommodated into a region provided with the partition ribs 34, out of the lower housing 30.

Figure 6:
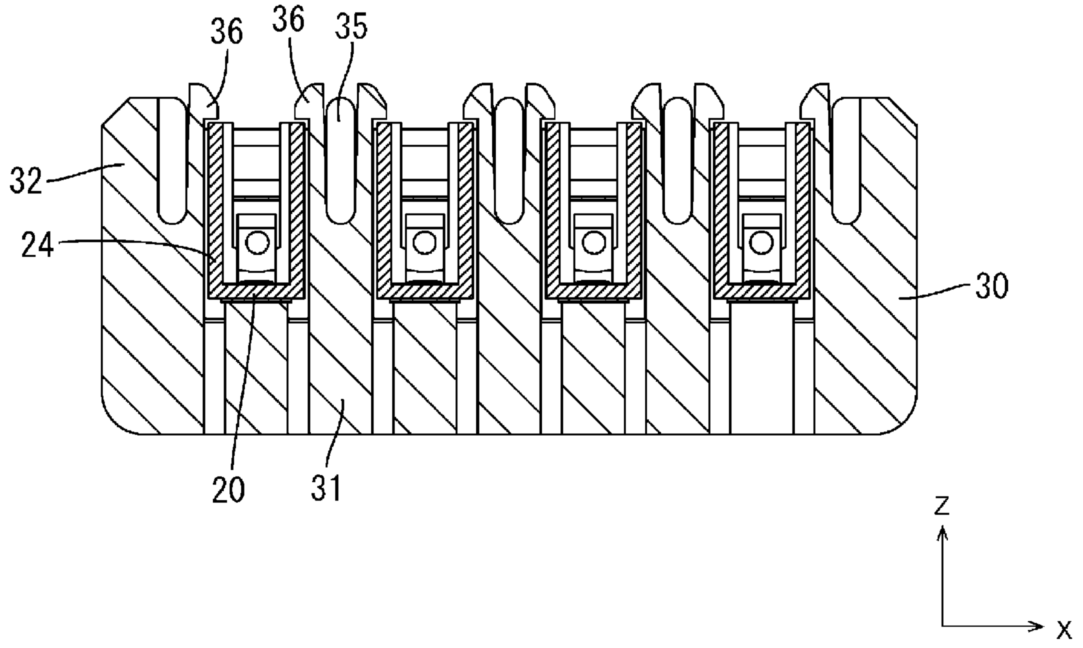
FIG. 6 is a section along VI-VI in FIG. 5.

As shown in FIG. 6, locking claws 36 for preventing the joint terminal 12 from coming out upward are formed at positions near front end parts on upper edge parts of the partition walls 35. Locking claws 36 for preventing the joint terminal 12 from coming out upward are formed at positions corresponding to the former locking claws 36 also on upper edge parts of the side walls 32 of the lower housing 30. The locking claws 36 are formed to be resiliently deformable in the lateral direction.

Figure 7:
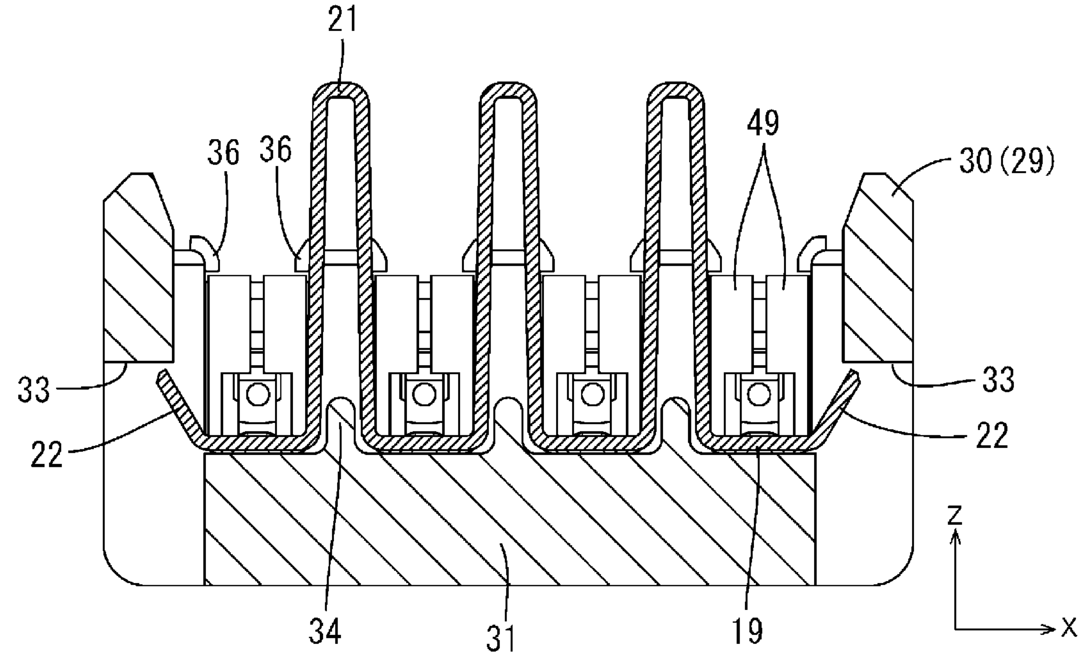
FIG. 7 is a section along VII-VII in FIG. 5.

As shown in FIGS. 4 and 7, locking recesses 33 are formed in parts near front end parts in the outer surfaces of the side walls 32 of the lower housing 30.

[Upper Housing 60]

As shown in FIG. 3, the lower housing 30 has an upper part covered by the upper housing 60 assembled from above. The upper housing 60 is formed by injection molding an insulating synthetic resin.

The upper housing 60 includes an upper wall 61, side walls 62 extending downward from both left and right side edges of the upper wall 61 and a rear wall 63 extending downward from the rear edge of the upper wall 61.

As shown in FIG. 4, lock claws 66 are formed at positions near front end parts of the side walls 62 of the upper housing 60. The lock claws 66 are formed to project inwardly of the upper housing 60 in the lateral direction. These lock claws 66 are resiliently engaged with the locking recesses 33 provided in the side walls 32 of the lower housing 30, whereby the lower housing 30 and the upper housing 60 are integrally assembled.

As shown in FIG. 1, the rear wall 63 of the upper housing 60 is formed with escaping grooves 64 configured to avoid interference with the side walls 32 and the partition walls 35 of the lower housing 30 and extending upward from the lower end edge of the rear wall 63. With the lower housing 30 and the upper housing 60 assembled, the side walls 32 and the partition walls 35 of the lower housing 30 are disposed inside the escaping grooves 64.

As shown in FIG. 1, a plurality of (four in this embodiment) wire draw-out openings 65, through which the wires 11 are drawn out rearward, are formed at intervals in the lateral direction in the rear wall 63 of the upper housing 60. Each wire draw-out opening 65 is formed between the escaping grooves 64 in the rear wall 63.

Figure 8:
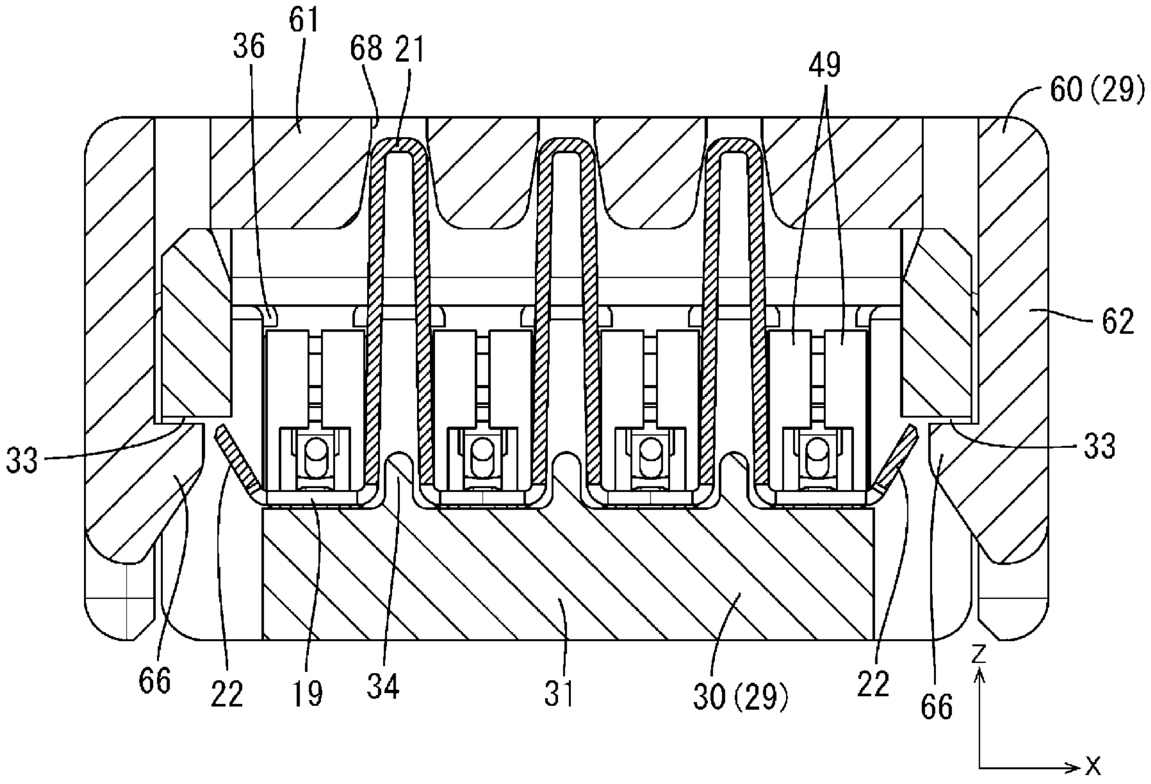
FIG. 8 is a section along VIII-VIII in FIG. 3.

As shown in FIG. 2, a substantially one third region from a front end part of the upper housing 60 serves as a coupling portion accommodating portion 67 bulging somewhat upward. A plurality of (three in this embodiment) escaping slits 68 extending in the front-rear direction and arranged at intervals in the lateral direction are formed in a region corresponding to the coupling portion accommodating portion 67, out of the upper wall 61 of the upper housing 60. As shown in FIG. 8, with the lower housing 30 and the upper housing 60 assembled, upper end parts of bent portions 21 to be described later are accommodated into the escaping slits 68. In this way, it is possible to avoid the interference of the upper end parts of the bent portions 21 and the upper wall 61.

[Joint Terminal 12]

Figure 9:
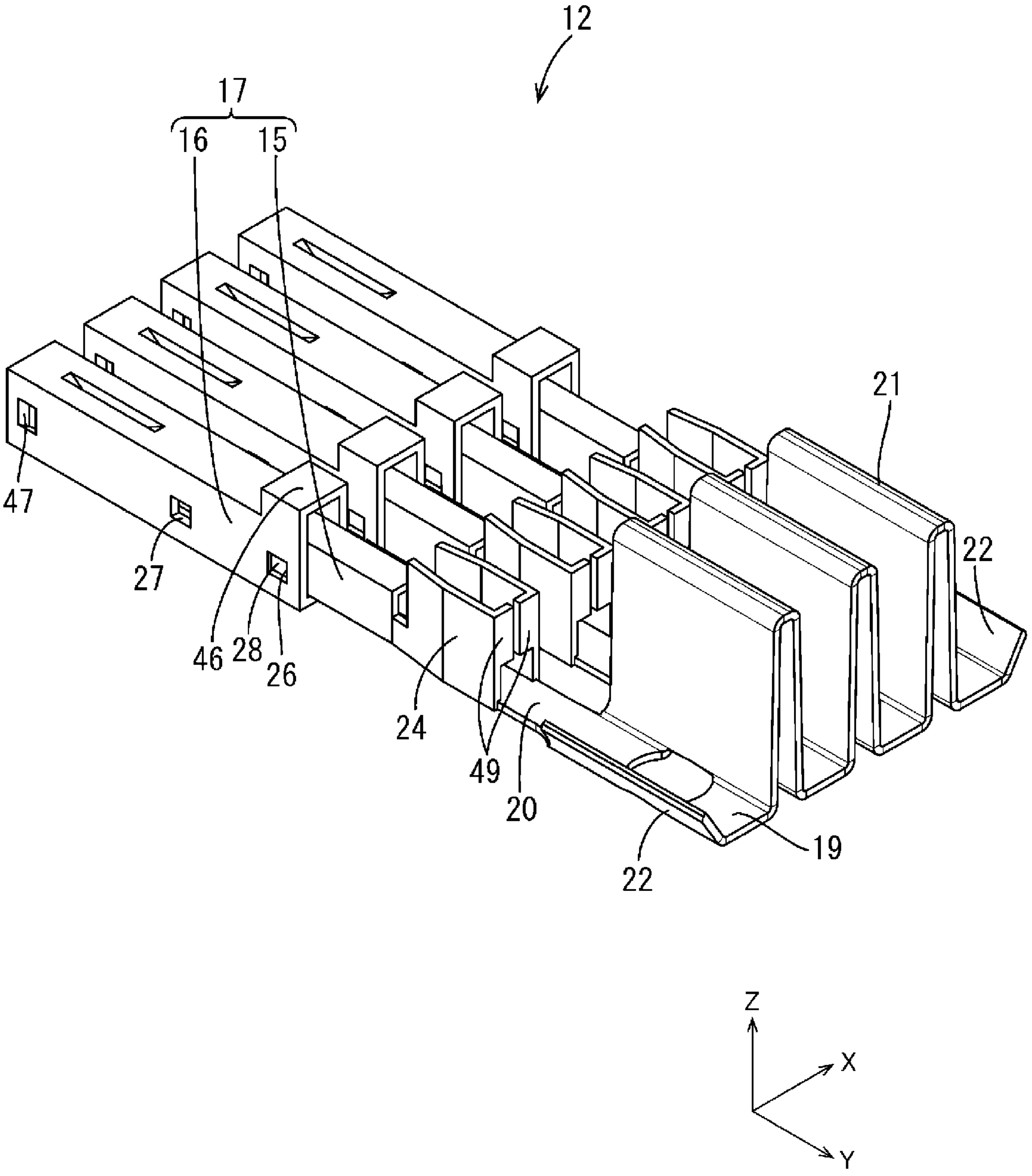
FIG. 9 is a perspective view showing a joint terminal.

As shown in FIG. 9, the joint terminal 12 includes a plurality of (four in this embodiment) branch portions 20 arranged along the lateral direction (an example of an arrangement direction), a plurality of (four in this embodiment) wire connecting portions 17 respectively continuous with the plurality of branch portions 20 and to be connected to the wires 11, and the coupling portion 19 coupling the plurality of branch portions 20.

The joint terminal 12 is formed by press-working a metal plate material into a predetermined shape. An arbitrary metal such as copper, copper alloy, aluminum, aluminum alloy and stainless steel can be appropriately selected as a metal constituting the joint terminal 12 if necessary. The joint terminal 12 according to this embodiment is made of copper or copper alloy. A plating layer may be formed on the surface of the joint terminal 12. An arbitrary metal such as tin, nickel and silver can be appropriately selected as a metal constituting the plating layer if necessary. Tin plating is applied to the joint terminal 12 according to this embodiment.

[Coupling Portion 19]

The coupling portion 19 is formed by bending a metal plate material elongated in the lateral direction. The coupling portion 19 is formed with a plurality of (three in this embodiment) bent portions 21 bent to have a chevron shape projecting upward when viewed from front. In other words, the bent portions 21 are bent to project upward from a plate surface of the coupling portion 19 expanding in the front-rear direction and lateral direction in a state before being bent. Both left and right end parts of the coupling portion 19 are bent obliquely upwardly and serve as end engaging portions 22 to be resiliently engaged with the locking recesses 33 of the lower housing 30.

The coupling portion 19 is resiliently stretchable in the lateral direction as a whole by deforming the bent portions 21 to open or close in the lateral direction. As a result, the coupling portion 19 is compressed or elongated in the lateral direction, thereby generating a resilient force in the coupling portion 19. The coupling portion 19 is formed by cutting an elongated carrier 50 to a predetermined length and applying bending.

[Branch Portions 20]

The coupling portion 19 is formed with a plurality of (four in this embodiment) branch portions 20 extending rearward. The branch portions 20 are formed to be elongated in the front-rear direction. The aforementioned bent portions 21 are formed in regions between parts of the coupling portion 19 where the plurality of branch portions 20 are provided.

Locking wall portions 24 extending upward from both left and right side edges of the branch portion 20 are formed in a rear half of the branch portion 20. The front end edge of the locking wall portion 24 is bent inwardly in the lateral direction and serves as an intersecting wall portion 49 intersecting the front-rear direction. In this embodiment, the locking wall portion 24 is formed perpendicular to the front-rear direction. A vertical height of the locking wall portion 24 is set to be substantially half the height of the bent portion 21. The wire connecting portion 17 is continuous behind the branch portion 20.

[Wire Connecting Portions 17]

The wire connecting portion 17 includes a terminal body 15 made of metal and a slide portion 16 relatively slidable with respect to the terminal body 15.

[Terminal Body 15]

As shown in FIG. 3, the terminal body 15 is in the form of a rectangular tube extending in the front-rear direction. The terminal body 15 includes an upper sandwiching piece 18A extending rearward from the upper wall of the terminal body 15 and a lower sandwiching piece 18B extending rearward from the lower wall of the terminal body 15. The upper and lower sandwiching pieces 18A, 18B have a shape elongated in the front-rear direction. Lengths in the front-rear direction of the upper and lower sandwiching pieces 18A, 18B are substantially equal.

An upper holding protrusion 23A projecting downward is provided at a position forward of a rear end part on the lower surface of the upper sandwiching piece 18A. A lower holding protrusion 23B projecting upward is provided on a rear end part of the upper surface of the lower sandwiching piece 18B. The lower and upper holding protrusions 23B, 23A are provided at positions shifted in the front-rear direction.

The lower surface of the upper sandwiching piece 18A and the upper surface of the lower sandwiching piece 18B bite into an oxide film formed on the surface of the core 13 to strip the oxide film, whereby a metal surface of the core 13 is exposed. The core 13 and the terminal body 15 are electrically connected by the contact of this metal surface and the upper and lower sandwiching pieces 18A, 18B.

[Slide Portions 16]

As shown in FIG. 9, the slide portion 16 is in the form of a rectangular tube extending in the front-rear direction. The slide portion 16 is formed by a known method such as cutting, casting or press working if necessary. An arbitrary metal such as copper, copper alloy, aluminum, aluminum alloy and stainless steel can be appropriately selected as a metal constituting the slide portion 16 if necessary. The slide portion 16 according to this embodiment is made of stainless steel. A plating layer may be formed on the surface of the slide portion 16. An arbitrary metal such as tin, nickel and silver can be appropriately selected as a metal constituting the plating layer if necessary.

As shown in FIG. 3, an inner cross-sectional shape of the slide portion 16 is the same as or somewhat larger than an outer cross-sectional shape of a region of the terminal body 15 where the upper and lower sandwiching pieces 18A, 18B are provided. In this way, the slide portion 16 is disposed outside the region of the terminal body 15 where the upper and lower sandwiching pieces 18A, 18B are provided. In other words, the upper and lower sandwiching pieces 18A, 18B can be accommodated inside the slide portion 16.

As shown in FIG. 3, an upper contact portion 25A (an example of a contact portion) projecting downward is provided on the lower surface of the upper wall of the slide portion 16. A lower contact portion 25A (an example of the contact portion) projecting upward is provided on the upper surface of the lower wall of the slide portion 16.

As shown in FIG. 9, a partial lock receiving portion 26 is open at a position near a front end part in the front-rear direction in a side wall of the slide portion 16. Further, a full lock receiving portion 27 is open at a position behind the partial lock receiving portion 26 in the side wall of the slide portion 16. The partial lock receiving portion 26 and the full lock receiving portion 27 are resiliently lockable to a locking projection 28 provided on a side wall of the terminal body 15.

With the locking projection 28 of the terminal body 15 and the partial lock receiving portion 26 of the slide portion 16 locked, the slide portion 16 is held at a partial locking position with respect to the terminal body 15. In this state, the upper and lower contact portions 25A, 25B of the slide portion 16 are separated rearward from the rear end edges of the upper and lower sandwiching pieces 18A, 18B of the terminal body 15. Further, in this state, a distance between the upper and lower sandwiching pieces 18A, 18B is set larger than a diameter of the core 13.

With the locking projection 28 of the terminal body 15 and the full lock receiving portion 27 of the slide portion 16 locked, the slide portion 16 is held at a full locking position with respect to the terminal body 15. As shown in FIG. 3, in this state, the upper contact portion 25A of the slide portion 16 is in contact with the upper sandwiching piece 18A from above. Further, the lower contact portion 25B of the slide portion 16 is in contact with the lower sandwiching piece 18B from below.

As described above, the slide portion 16 is slidable between the partial locking position and the full locking position described above while being externally fit to the region of the terminal body 15 where the upper and lower sandwiching pieces 18A, 18B are provided.

As shown in FIG. 3, with the slide portion 16 held at the full locking position with respect to the terminal body 15, the upper contact portion 25A presses the upper sandwiching piece 18A from above, whereby the upper sandwiching piece 18A is deformed downward. Further, the lower contact portion 25B presses the lower sandwiching piece 18B from below, whereby the lower sandwiching piece 18B is deformed upward. In this way, the core 13 is disposed to extend in the front-rear direction (extending direction) in a space between the upper and lower sandwiching pieces 18A, 18B and the core 13 is vertically sandwiched by the resiliently deformed upper and lower sandwiching pieces 18A, 18B with the slide portion 16 held at the full locking position with respect to the terminal body 15. That is, the upper sandwiching piece 18A contacts the core 13 from above by being pressed downward by the upper contact portion 25A, and the lower sandwiching piece 18B contacts the core 13 from below by being pressed upward by the lower contact portion 25B.

As shown in FIG. 3, with the slide portion 16 held at the full locking position with respect to the terminal body 15, the upper holding protrusion 23A of the upper sandwiching piece 18A presses the core 13 from above and the lower holding protrusion 23B of the lower sandwiching piece 18B presses the core 13 from below. As just described, the core 13 is held in a state bent in the vertical direction by being pressed from above by the upper holding protrusion 23A and pressed from below by the lower holding protrusion 23B disposed at the position shifted in the front-rear direction from the upper holding protrusion 23A. Further, the core 13 and the joint terminal 12 are electrically connected also by the upper and lower holding protrusions 23A, 23B.

Figure 10:
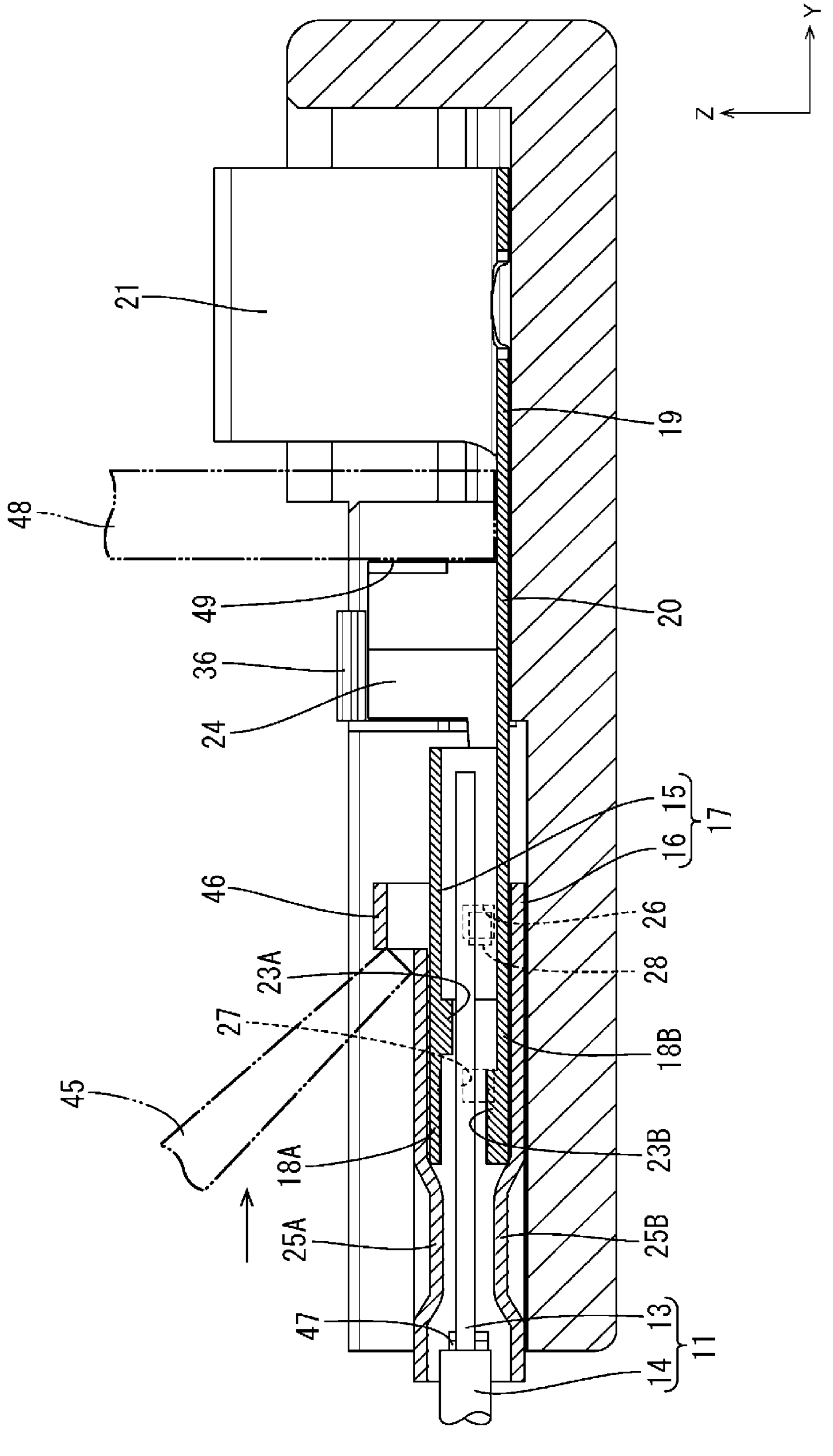
FIG. 10 is a side view in section showing a process of sliding a slide portion by a jig.

As shown in FIG. 10, a front end part of the slide portion 16 is provided with a jig contact portion 46 projecting upward from the upper wall. A jig 45 contacts the jig contact portion 46 from behind and the slide portion 16 is pushed forward by this jig, whereby the slide portion 16 is movable forward.

As shown in FIG. 9, a pair of guiding portions 47 projecting inwardly of the slide portion 16 are formed in both left and right side walls at positions near a rear end part of the slide portion 16. The guiding portions 47 are formed to become narrower from the rear to the front. The core 13 is guided into the slide portion 16 by the core 13 sliding in contact with the inner surfaces of the guiding portions 47.

[Assembling Process of Joint Connector 10]

Next, an example of an assembling process of the joint connector 10 according to this embodiment is described. The assembling process of the joint connector 10 is not limited to the one described below.

Figure 11:
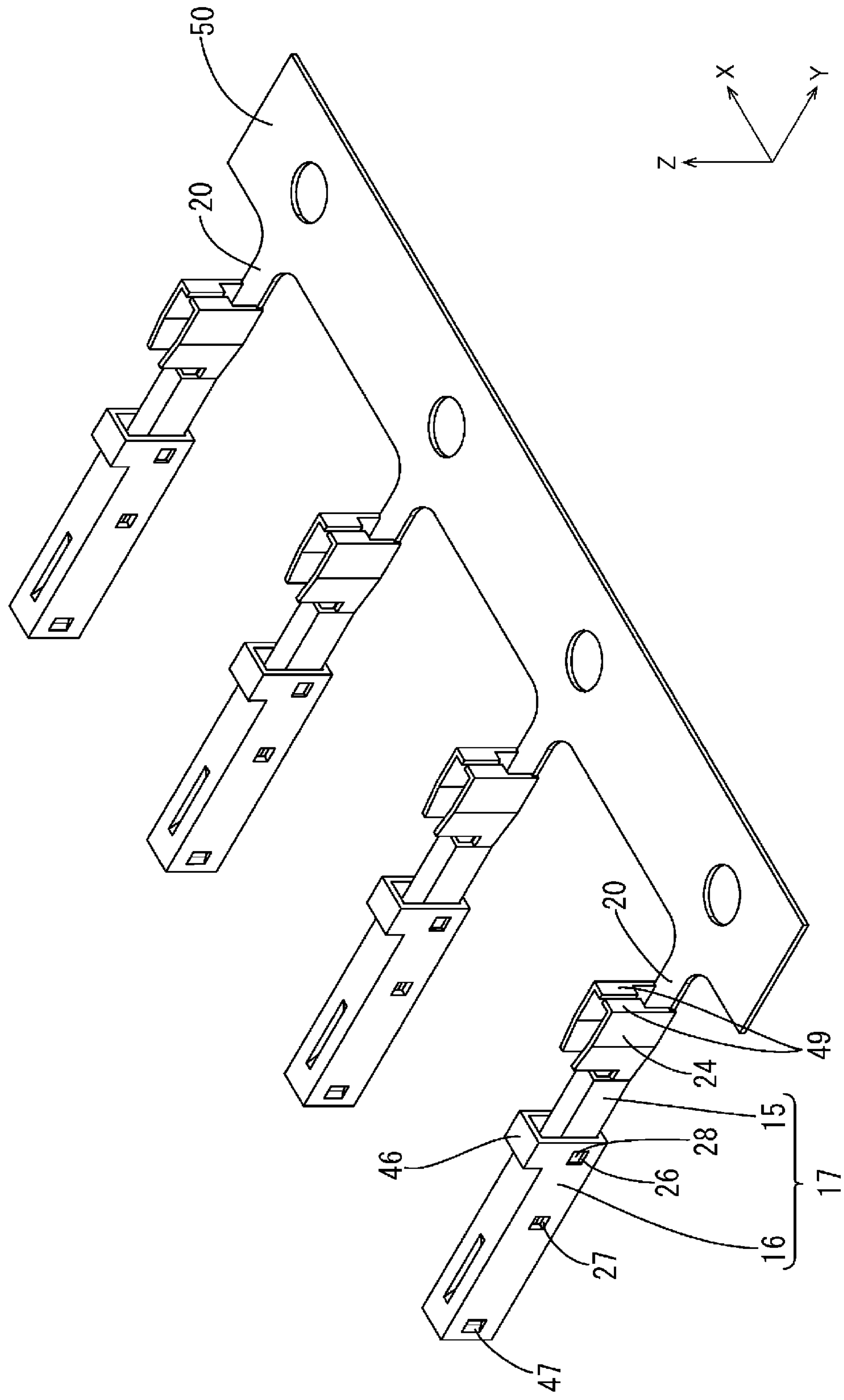
FIG. 11 is a perspective view showing the joint terminal in a state before a carrier is bent.

As shown in FIG. 11, a plurality of the branch portions 20 and a plurality of the wire connecting portions 17 extending rearward from the carrier 50 elongated in the lateral direction are formed by press-working a metal plate material. In this state, the slide portions 16 are held at the partial locking position with respect to the terminal bodies 15.

As shown in FIG. 9, the end engaging portions 22 are formed by bending the both end parts of the carrier 50 obliquely upward and the bent portions 21 are formed by bending regions between the branch portions 20 upward.

As shown in FIG. 4, the lower housing 30 and the upper housing 60 are respectively formed by injection molding the synthetic resin.

As shown in FIGS. 5, 6 and 7, the joint terminal 12 is accommodated into the lower housing 30 from above. The locking claws 36 formed on the partition walls 35 of the lower housing 30 resiliently lock the upper edge parts of the locking wall portions 24 of the joint terminal 12 from above, whereby the locking wall portions 24 of the joint terminal 12 are held in the lower housing 30 while being prevented from coming out upward.

Further, the coupling portion 19 is accommodated from above along the inner surfaces of the side walls 32 of the lower housing 30 while being somewhat compressed in the lateral direction. Then, the tips of the end engaging portions 22 slide in contact with the side walls 32 of the lower housing 30. In this way, the joint terminal 12 is smoothly guided to a predetermined position in the lower housing 30. When the end engaging portions 22 reach the locking recesses 33 of the lower housing 30, the coupling portion 19 is restored and the end engaging portions 22 are locked to the upper walls of the locking recesses 33 from below. In this way, the coupling portion 19 of the joint terminal 12 is held in the lower housing 30 while being prevented from coming out upward.

The cores 13 of the wires 11 are exposed by stripping the insulation coatings 14 by a known method. As shown in FIG. 10, the front end part of the core 13 is introduced into the slide portion 16 through the rear end part of the slide portion 16. The core 13 comes into contact with the guiding portions 47 of the slide portion 16, thereby being guided into the slide portion 16. When the wire 11 is further pushed forward, the front end part of the core 13 enters the terminal body 15 and reaches the space between the upper and lower sandwiching pieces 18A, 18B.

Subsequently, as shown in FIG. 10, a pressing jig 48 is arranged in front of the intersecting wall portions 49 and the jig 45 is brought into contact with the jig contact portion 46 from behind, thereby sliding the slide portion 16 forward. The slide portion 16 is relatively moved forward with respect to the terminal body 15. At this time, the locking projection 28 of the terminal body 15 and the partial lock receiving portion 26 of the slide portion 16 are disengaged and the side wall of the slide portion 16 rides on the locking projection 28 to be deformed and expanded.

When the slide portion 16 is moved forward, the side wall of the slide portion 16 is restored and the locking projection 28 of the terminal body 15 and the full lock receiving portion 27 of the slide portion 16 are resiliently locked. In this way, the slide portion 16 is held at the full locking position with respect to the terminal body 15.

With the slide portion 16 held at the full locking position with respect to the terminal body 15, the upper contact portion 25A of the slide portion 16 comes into contact with the upper sandwiching piece 18A of the terminal body 15 from above to press the upper sandwiching piece 18A downward. Further, the lower contact portion 25B of the slide portion 16 comes into contact with the lower sandwiching piece 18B of the terminal body 15 from below to press the lower sandwiching piece 18B upward. In this way, the core 13 is vertically sandwiched by the upper and lower sandwiching pieces 18A, 18B (see FIG. 3).

As shown in FIG. 3, the core 13 is sandwiched by the lower surface of the upper sandwiching piece 18A and the upper surface of the lower sandwiching piece 18B, whereby the oxide film formed on the surface of the core 13 is stripped to expose the metal surface constituting the core 13. The wire 11 and the joint terminal 12 are electrically connected by the contact of this metal surface and the upper and lower sandwiching pieces 18A, 18B. In this way, the plurality of wires 11 are electrically connected via the joint terminal 12.

With the core 13 vertically sandwiched by the upper and lower sandwiching pieces 18A, 18B, the core 13 is sandwiched by the upper holding protrusion 23A of the upper sandwiching piece 18A and the lower holding protrusion 23B of the lower sandwiching piece 18B, thereby extending in the front-rear direction and being held in the state bent in the vertical direction. In this way, the core 13 can be firmly held, wherefore a holding force of the wire 11 and the joint terminal 12 can be enhanced when a pulling force is applied to the wire 11.

If the slide portion 16 is pushed forward by the jig 45, the terminal body 15 and the branch portion 20 are also pushed forward. At this time, the intersecting wall portions 49 come into contact with the pressing jig 48 from behind, thereby suppressing forward movements of the terminal body 15 and the branch portion 20. After the joint terminal 12 and the wires 11 are electrically connected, the pressing jig 48 is removed.

As shown in FIG. 3, the upper housing 60 is assembled with the lower housing 30 from above. The lock claws 66 provided on the side walls 62 of the upper housing 60 are resiliently locked to the locking recesses 33 provided in the side walls 32 of the lower housing 30, whereby the upper housing 60 and the lower housing 30 are integrally assembled (see FIG. 8). In this way, the joint connector 10 is completed.

[Functions and Effects of Embodiment]

Next, functions and effects of this embodiment are described. This embodiment relates to the joint connector 10 for electrically connecting the plurality of wires 11, the joint connector 10 including the housing 29 and the joint terminal 12 to be disposed in the housing 29, wherein the joint terminal 12 includes the plurality of branch portions 20 arranged along the lateral direction, the plurality of wire connecting portions 17 respectively continuous with the plurality of branch portions 20 and to be connected to the plurality of wires 11, and the coupling portion 19 for electrically connecting the plurality of branch portions 20 by coupling the plurality of branch portions 20, the coupling portion 19 is in the form of a plate extending in the lateral direction is bent, and the coupling portion 19 is engaged with the housing 29.

By engaging the bent coupling portion 19 with the housing 29, the joint terminal 12 can be easily mounted into the housing 29. In this way, the efficiency of an assembling operation of the joint terminal 12 and the housing 29 can be improved as compared to the case where the joint terminal 12 is press-fit into the housing 29. Therefore, the efficiency of the assembling operation of the joint connector 10 can be improved.

Further, according to this embodiment, the end engaging portions 22 to be engaged with the housing 29 are provided on the both end parts of the coupling portion 19 in the lateral direction.

According to the above configuration, the joint terminal 12 can be mounted into the housing 29 by a simple method of engaging the end engaging portions 22 provided on the both end parts of the coupling portion 19 with the housing 29 with the coupling portion 19 stretched in the lateral direction to generate a resilient force.

According to this embodiment, each of the plurality of wire connecting portions 17 includes the terminal body 15 having the upper and lower sandwiching portions 18A, 18B for sandwiching the wire 11 and the slide portion 16 slidable with respect to the terminal body 15 along the extending direction of the wire 11, the slide portion 16 has a tubular shape, the upper and lower sandwiching portions 18A, 18B are accommodated into the slide portion 16, the slide portion 16 includes the upper and lower contact portions 25A, 25B projecting inward from the inner wall of the slide portion 16 and configured to press the upper and lower sandwiching portions 18A, 18B toward the wire 11 by coming into contact with the upper and lower sandwiching portions 18A, 18B, and the upper and lower contact portions 25A, 25B come into contact with the upper and lower sandwiching portions 18A, 18B when the slide portion 16 moves to a contact position.

According to the above configuration, by sliding the slide portion 16 to the contact position, the upper and lower sandwiching portions 18A, 18B are pressed toward the wire 11 by the upper and lower contact portions 25A, 25B. In this way, the wire 11 and the wire connecting portion 17 can be electrically connected via the upper and lower sandwiching portions 18A, 18B.

Further, according to this embodiment, the terminal body 15 includes the intersecting wall portions 49 intersecting a sliding direction of the slide portion 16 to the contact position on a front end part in the sliding direction.

When the slide portion 16 is slid to the contact position, the upper and lower sandwiching portions 18A, 18B are pressed forward in the sliding direction by the slide portion 16. At this time, by disposing the pressing jig 48 in front of the intersecting wall portions 49 and bringing this pressing jig 48 into contact with the intersecting wall portions 49 from front, a forward movement of the terminal body 15 in the sliding direction can be suppressed during the movement of the slide portion 16.

Second Embodiment

Figure 12:
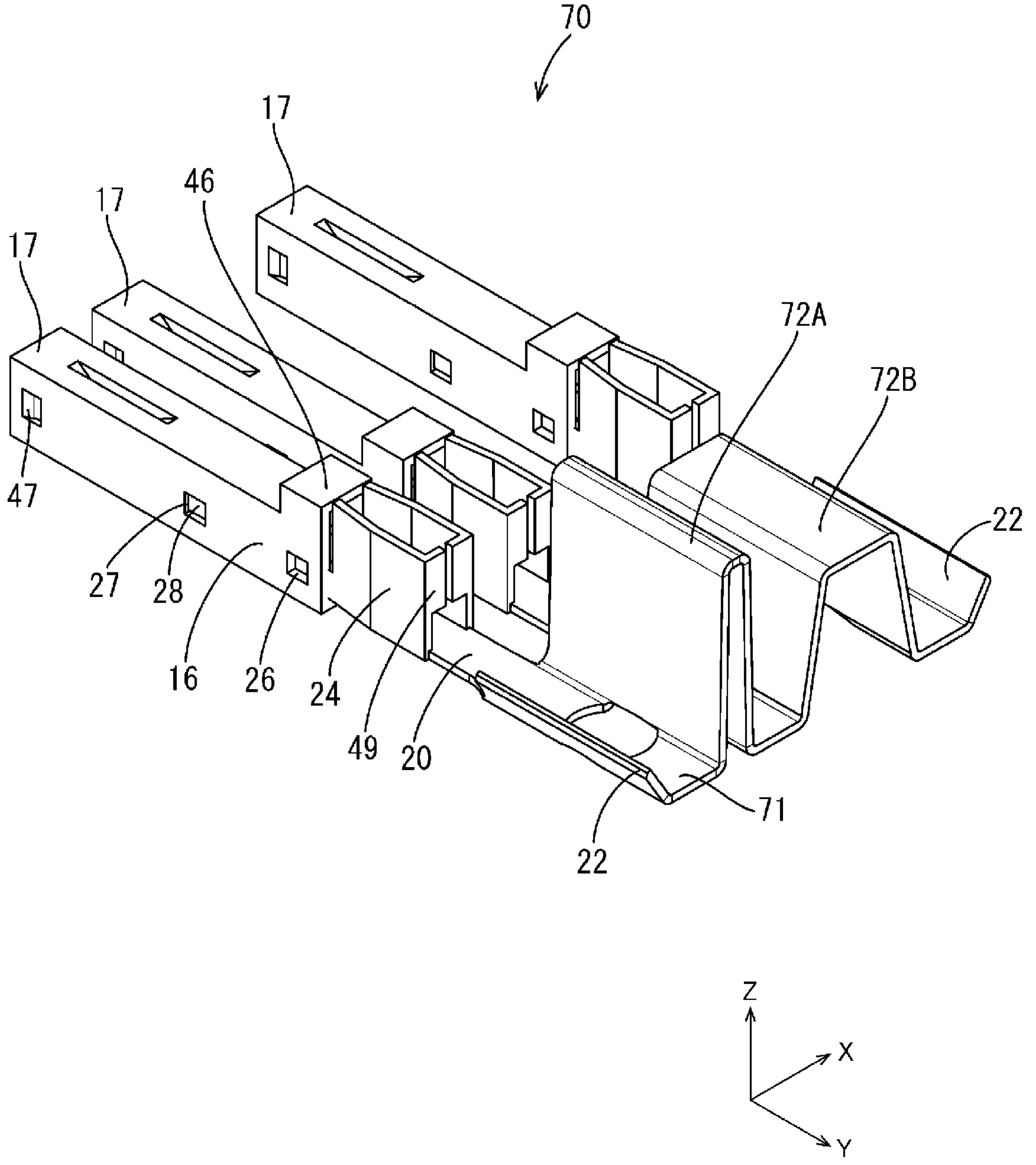
FIG. 12 is a perspective view showing a joint terminal according to a second embodiment.

Next, a second embodiment of the present disclosure is described with reference to FIG. 12. In a joint terminal 70 according to this embodiment, a coupling portion 71 is provided with a bent portion 72A located on a right side and a pitch adjusting bent portion 72B located on a left side. The pitch adjusting bent portion 72B is set to have a smaller height in the vertical direction than the bent portion 72A formed on the right side. Further, the pitch adjusting bent portion 72B formed on the left side of the coupling portion 71 is set to have a larger width in the lateral direction than the bent portion 72A formed on the right side.

The joint terminal 70 according to this embodiment is formed with three branch portions 20 and three wire connecting portions 17 continuous with the branch portions 20. Pitch intervals in the lateral direction between adjacent ones of the three wire connecting portions 17 are different. The pitch interval between the wire connecting portion 17 in a center of the coupling portion 71 and the wire connecting portion 17 on a left end part is wider than that between the wire connecting portion 17 in the center of the coupling portion 71 and the wire connecting portion 17 on a right end part.

Since the configuration other than the above is substantially similar to that of the first embodiment, the same members are denoted by the same reference signs and repeated description is omitted.

According to this embodiment, the coupling portion 71 includes the plurality of bent portions 72A, 72B bent to project from a plate surface of the coupling portion 71, the plurality of bent portions 72A, 72B include at least one pitch adjusting bent portion 72B, and the pitch adjusting bent portion 72B has a bent shape different from that of the other bent portion 72A.

The pitch intervals between adjacent ones of the plurality of wire connecting portions 17 can be adjusted by making the bent shape of the pitch adjusting bent portion 72B different from that of the other bent portion 72A and changing the widths in the lateral direction.

Third Embodiment

Figure 13:
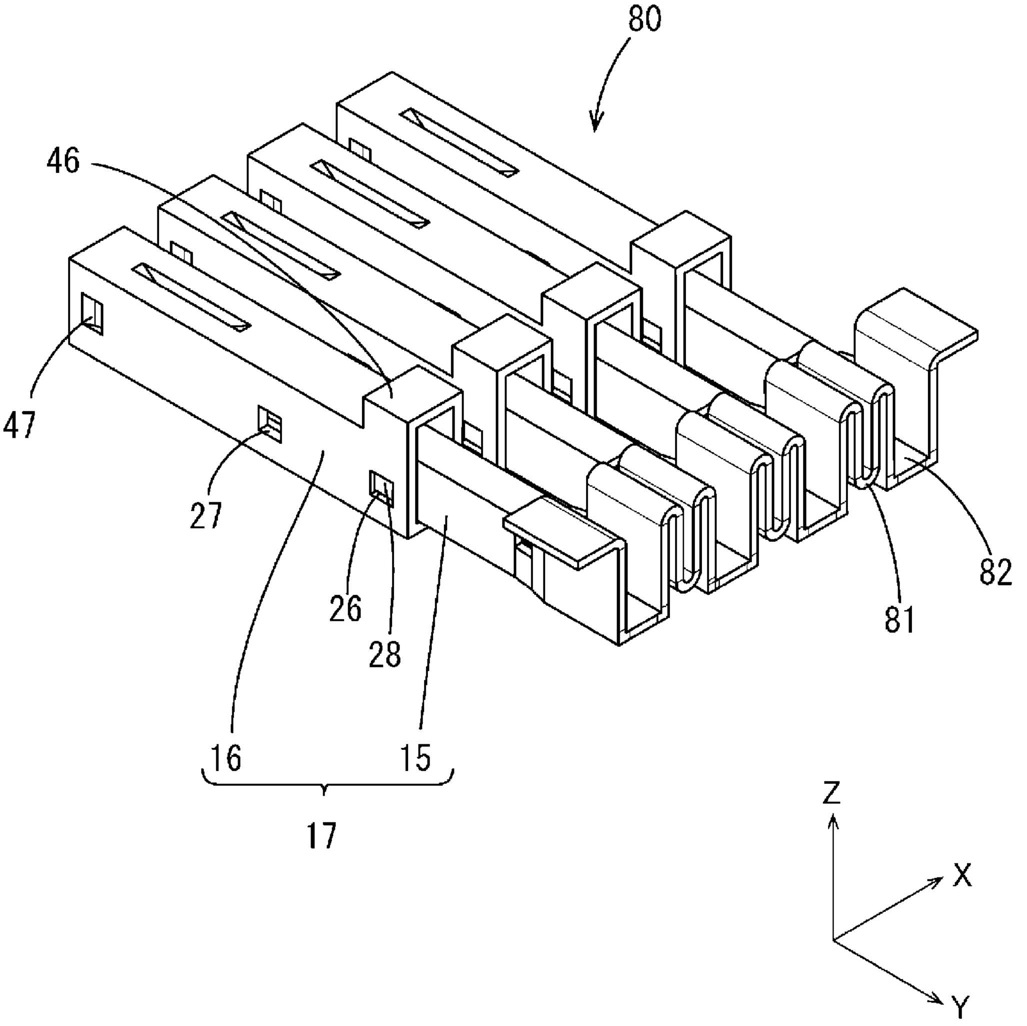
FIG. 13 is a perspective view showing a joint terminal according to a third embodiment.

Next, a third embodiment of the present disclosure is described with reference to FIG. 13. In a joint terminal 80 according to this embodiment, a bent portion 81 formed in a coupling portion 82 is formed by being bent a plurality of times into an M shape when viewed from front. In this way, a height in the vertical direction of the bent portion 81 is set substantially equal to that of a jig contact portion 46 of a slide portion 16. By adjusting the number of times of bending of the bent portion 81 in this way, a height of the joint terminal 80 can be arbitrarily adjusted. As a result, it is also possible to reduce the height of the joint terminal 80.

Fourth Embodiment

Figure 14:
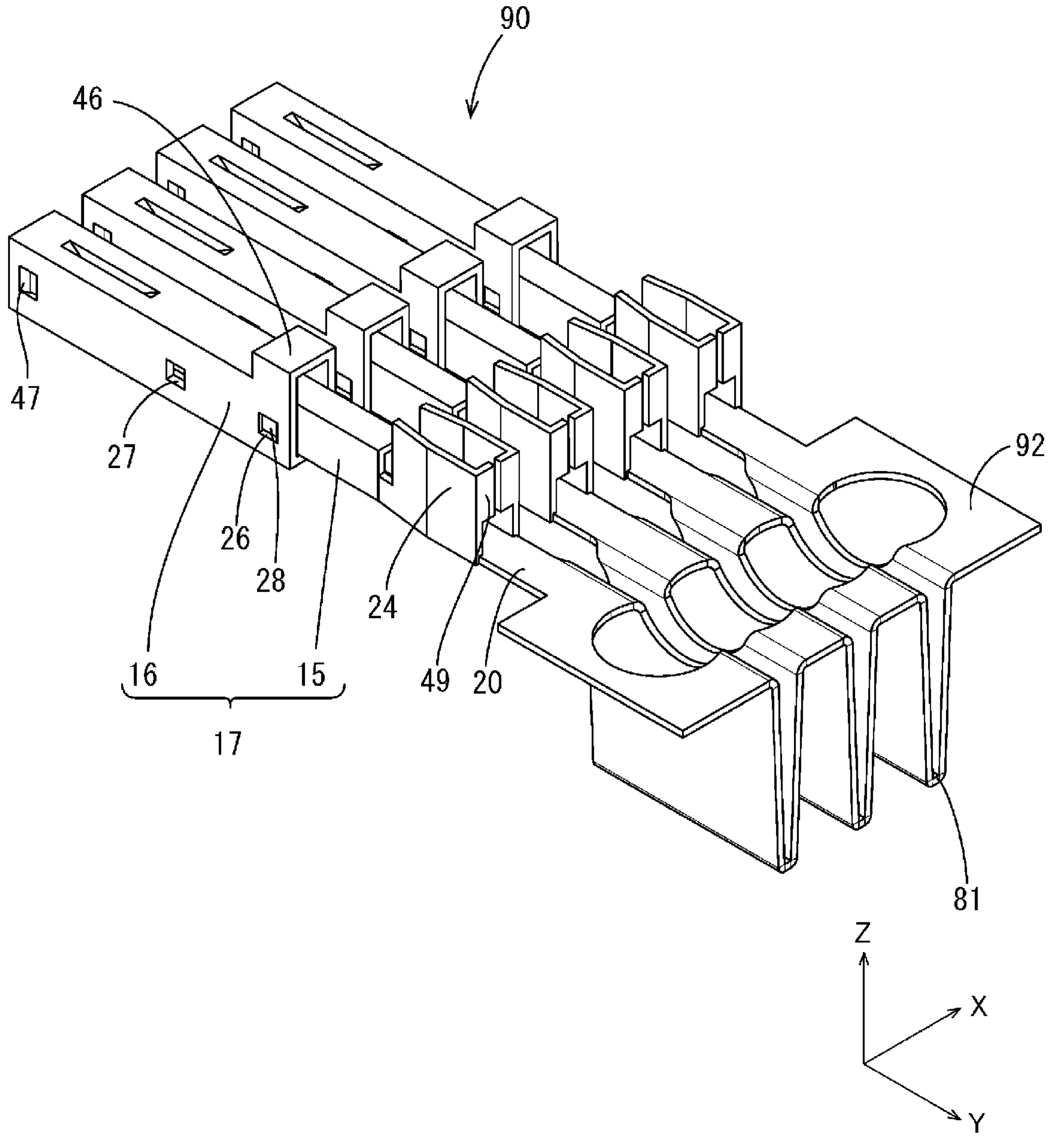
FIG. 14 is a perspective view showing a joint terminal according to a fourth embodiment.

Next, a fourth embodiment of the present disclosure is described with reference to FIG. 14. In a joint terminal 90 according to this embodiment, a bent portion 91 is bent to project downwardly of a coupling portion 92. This can deal with a case where a sufficient space cannot be secured above the coupling portion 92.

Fifth Embodiment

Figure 15:
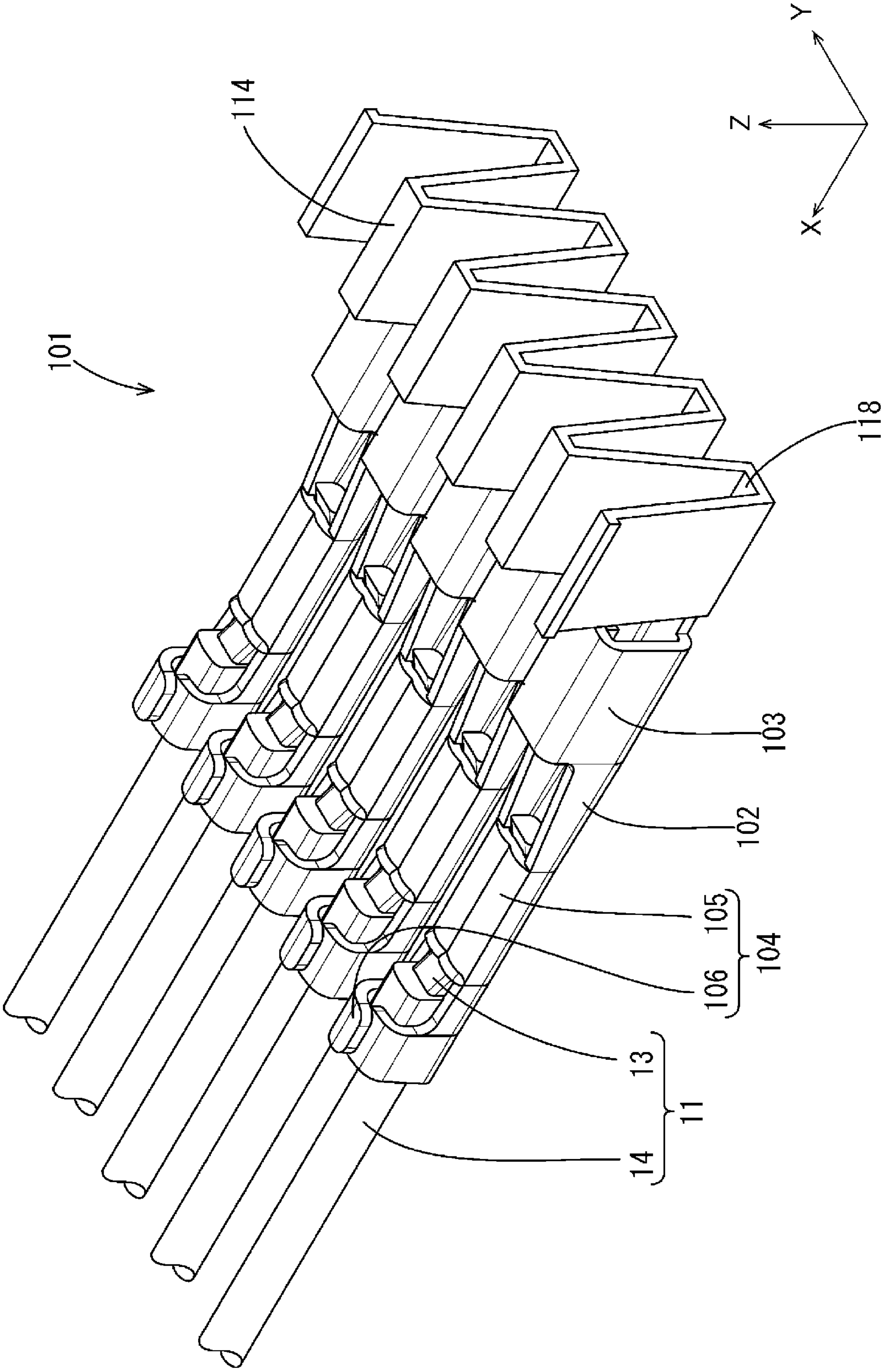
FIG. 15 is a perspective view showing a joint terminal according to a fifth embodiment.
Figure 16:
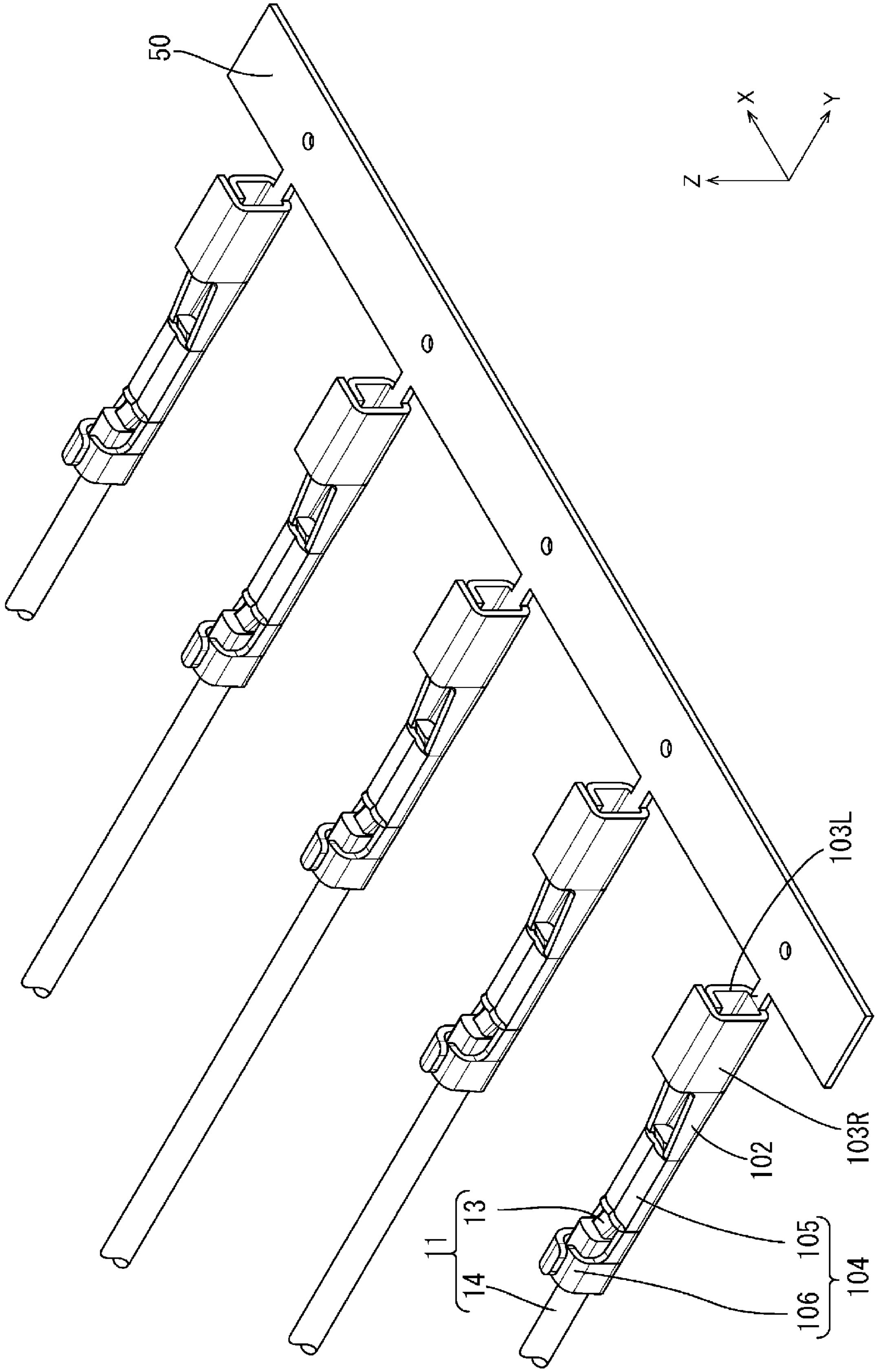
FIG. 16 is a perspective view showing the joint terminal before a carrier is bent.

Next, a joint connector 100 according to a fifth embodiment of the present disclosure is described with reference to FIGS. 15 to 21. As shown in FIGS. 15 and 16, in a joint terminal 101 according to this embodiment, the upper end edge of a locking wall portion 103R extending upward from the right side edge of a branch portion 102 is bent to left and the upper end edge of a locking wall portion 103L extending upward from the left side edge of the branch portion 102 is bent to right. In this way, the locking wall portions 103R, 103L are formed into a rectangular tube shape extending in the front-rear direction as a whole.

As shown in FIG. 15, a wire connecting portion 104 is provided behind the branch portion 102. The wire connecting portion 104 according to this embodiment is configured such that a wire barrel portion 105 (an example of a crimping portion) to be crimped to the outer periphery of a core 13 of a wire 11 and an insulation barrel portion 106 to be crimped to the outer periphery of an insulation coating 14 of the wire 11 are formed one behind the other.

Figure 17:
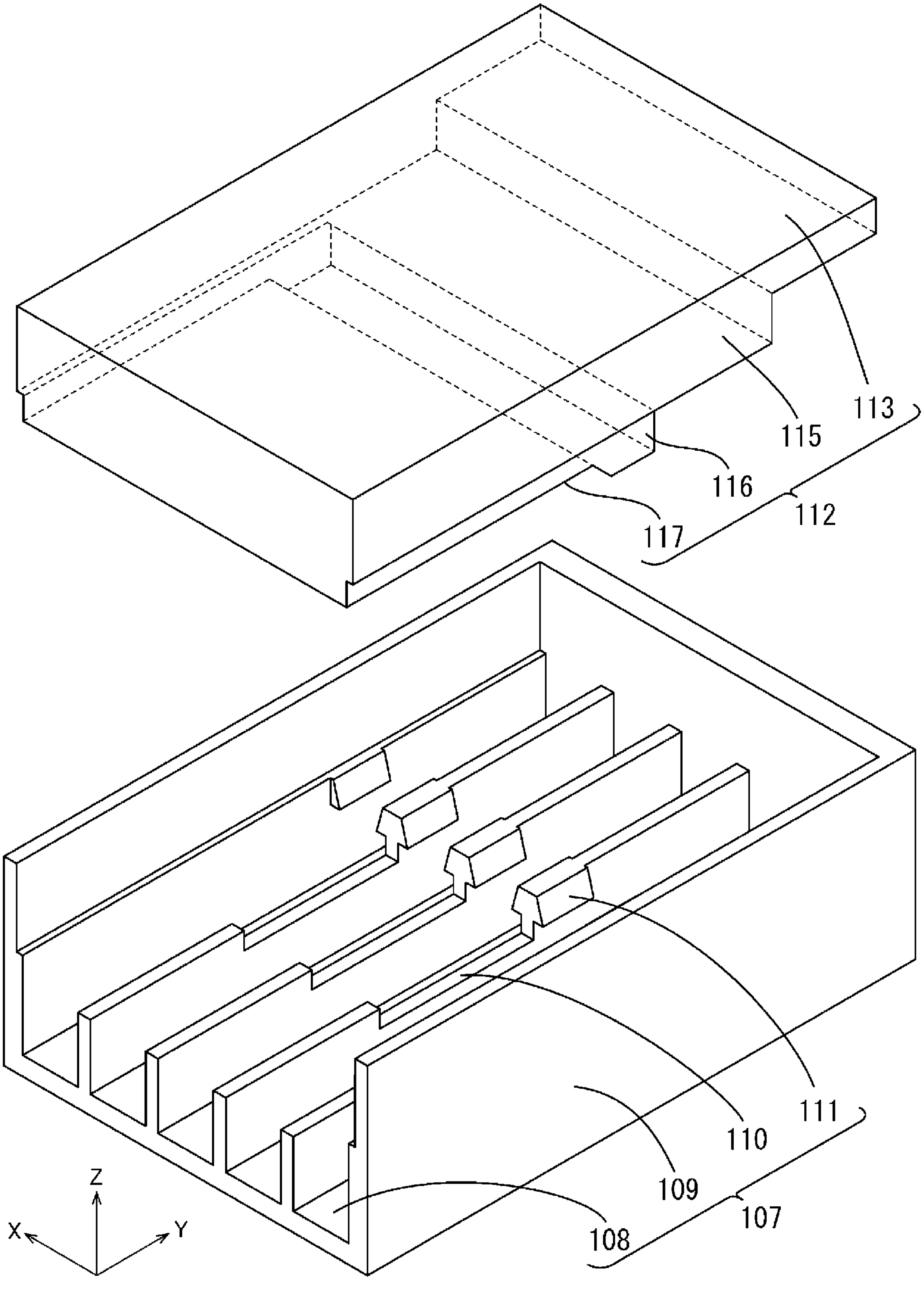
FIG. 17 is an exploded perspective view showing a lower housing and an upper housing.

As shown in FIG. 17, a lower housing 107 according to this embodiment includes a bottom wall 108, side walls 109 extending upward from both left and right side edges of the bottom wall 108 and a front wall extending upward from the front end edge of the bottom wall 108.

Figure 19:
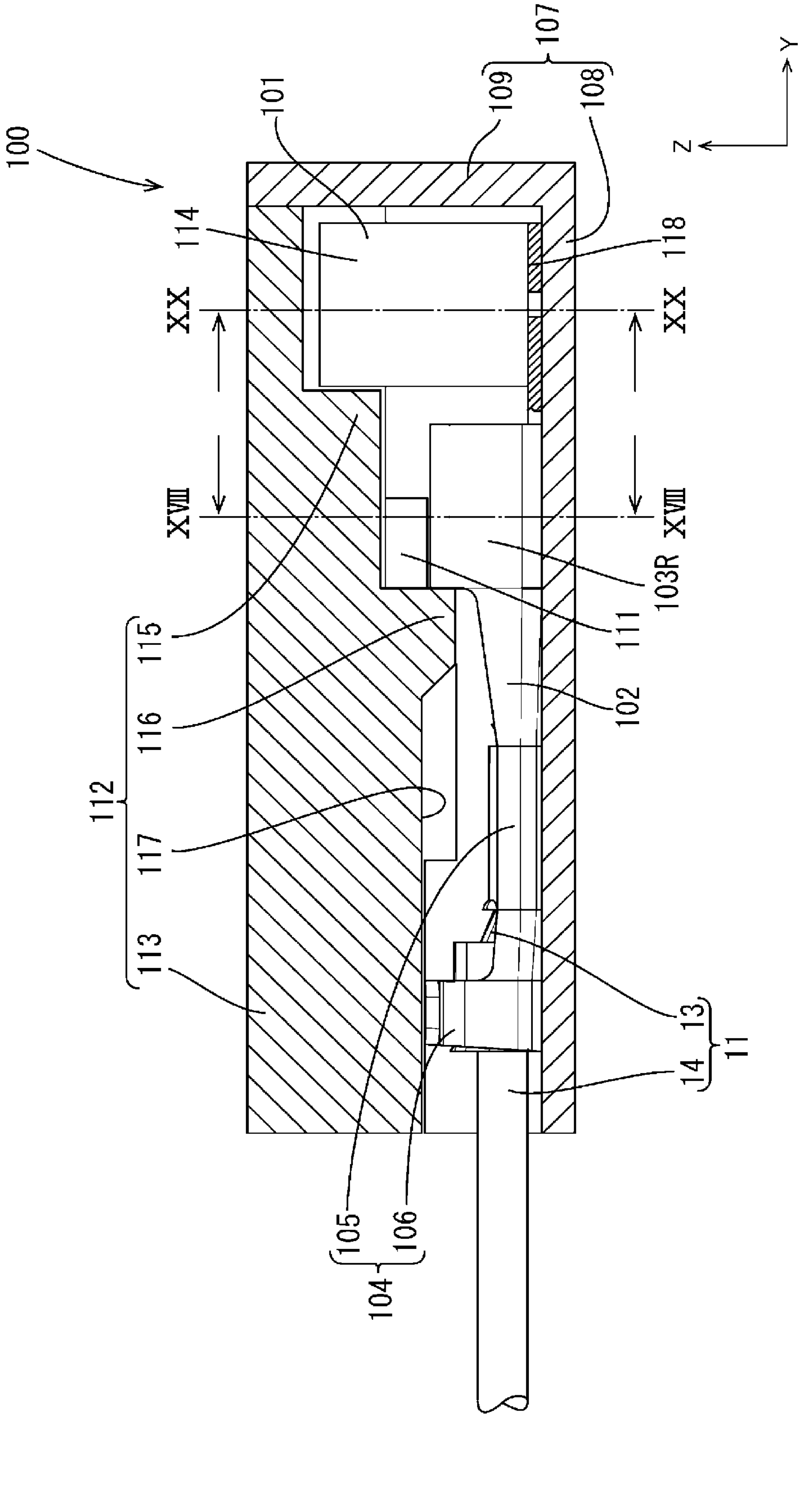
FIG. 19 is a side view in section showing a joint connector.

Partition walls 110 extending in the front-rear direction are formed at intervals in the lateral direction on the bottom wall 108. As shown in FIG. 19, locking claws 111 for holding the joint terminal 101 while preventing the joint terminal 101 from coming out upward by locking the locking wall portions 103R, 103L of the joint terminal 101 are formed on the upper end edges of the partition walls 110. Further, locking claws 111 for retaining the joint terminal 101 while preventing the joint terminal 101 from coming out upward are formed also on the inner surfaces of the side walls 109 of the lower housing 107.

As shown in FIG. 19, a first rear stop portion 115 projecting downward to lock the bent portions 114 from behind are formed at positions somewhat behind a front end part of an upper wall 113 on the lower surface of the upper wall 113 of an upper housing 112. A second rear stop portion 116 further projecting downward from the upper wall 113 to lock the locking wall portions 103R, 103L from behind is formed somewhat behind the first rear stop portion 115. In this way, a rearward movement of the joint terminal 101 can be suppressed also when the wire 11 is pulled rearward.

A retraction recess 117 for avoiding interference with the insulation barrel portions 106 is formed to be concave upward at a position somewhat behind the second rear stop portion 116.

Figure 20:
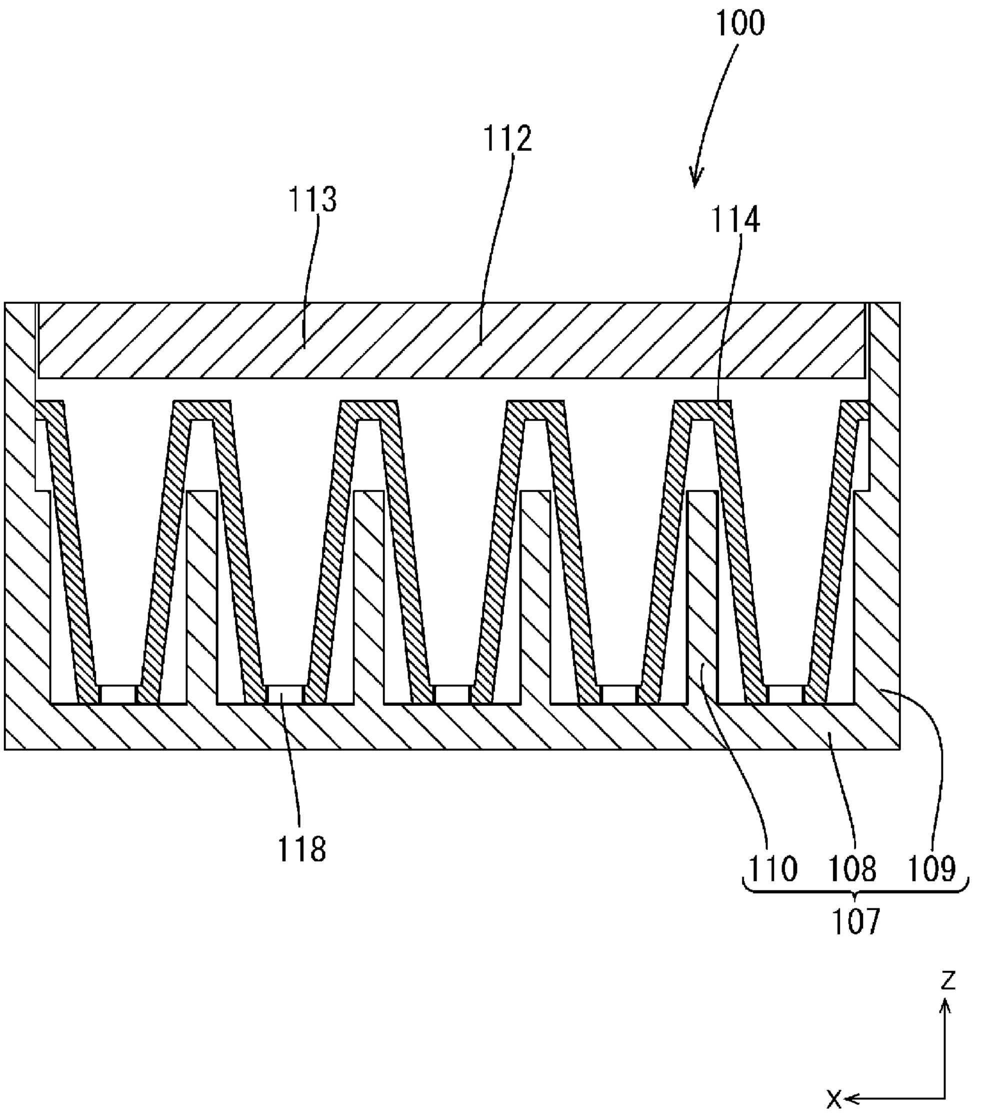
FIG. 20 is a section along XX-XX in FIG. 19.

As shown in FIG. 20, in this embodiment, the partition walls 110 enter the insides of the respective bent portions 114. In this way, the respective bent portions 114 are deformed to expand, with the result that a resilient force is generated in each bent portion 114. As a result, each of the plurality of bent portions 114 resiliently sandwiches the partition wall 110. In this embodiment, the partition walls 110 serve as individual engaging portions to be respectively resiliently engaged with the plurality of bent portions 114.

Since the configuration other than the above is substantially similar to that of the first embodiment, the same members are denoted by the same reference signs and repeated description is omitted.

An example of an assembling process of the joint connector 100 according to this embodiment is described. The assembling process of the joint connector 100 is not limited to the one described below.

Figure 21:
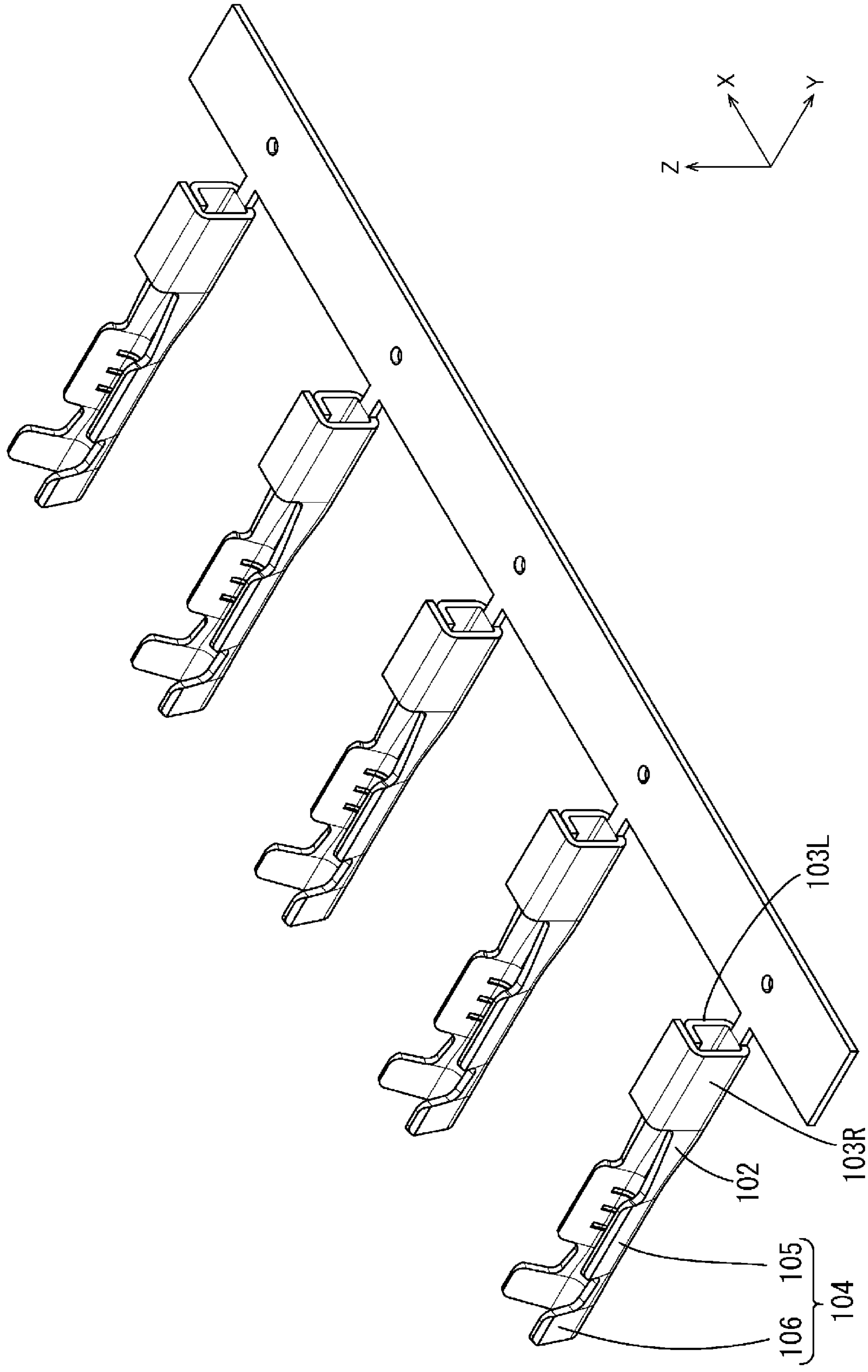
FIG. 21 is a perspective view showing the joint terminal in a state before the carrier is bent and wires are crimped.

As shown in FIG. 21, a plurality of the wire connecting portion 104 connected to a carrier 50 elongated in the lateral direction are formed by press-working a metal plate material.

As shown in FIG. 15, the wire barrel portion 105 is crimped to the outer periphery of the core 13 and the insulation barrel portion 106 is crimped to the outer periphery of the insulation coating 14 in a stripped end part of the wire 11. Further, the bent portions 114 are formed by bending the carrier 50.

Figure 18:
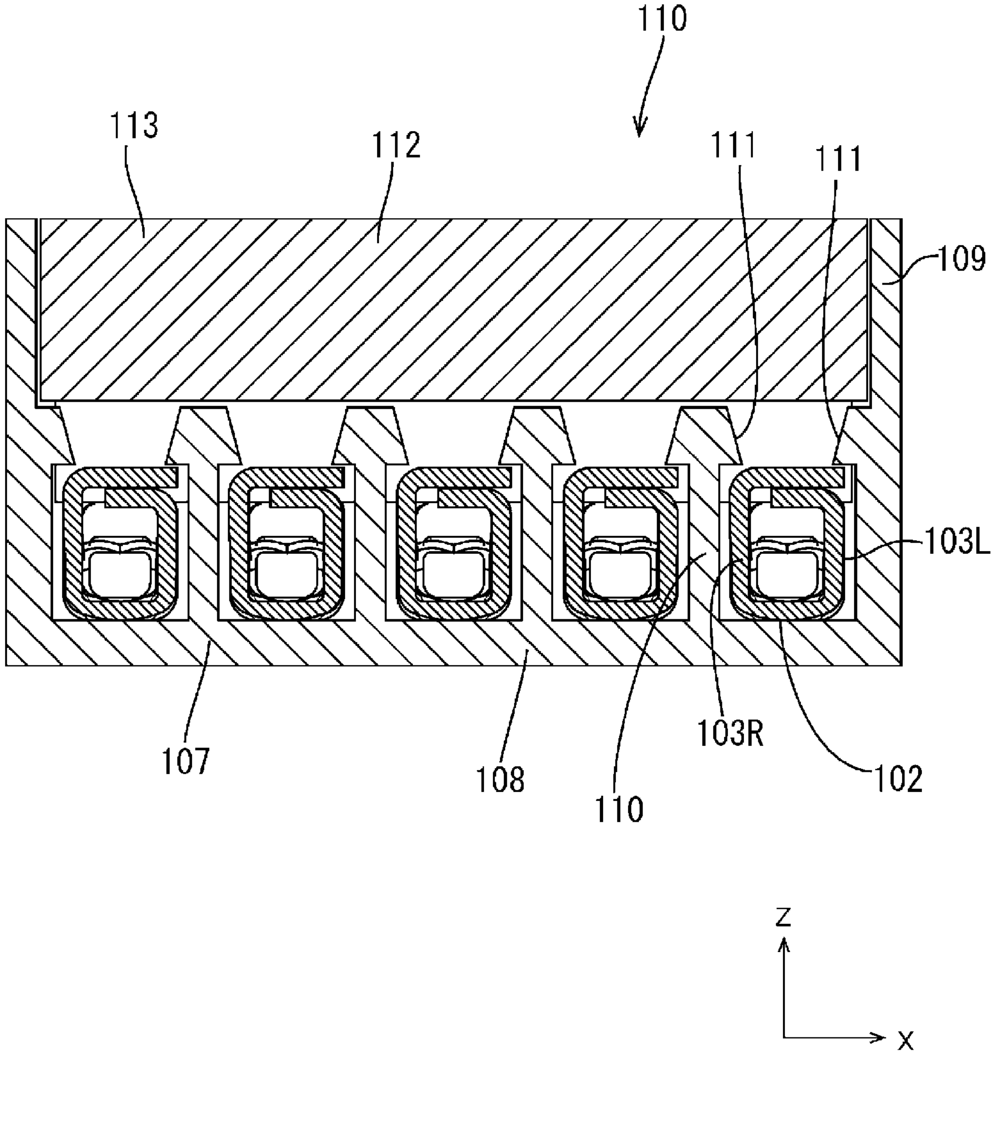
FIG. 18 is a section along XVIII-XVIII in FIG. 19.

As shown in FIGS. 18 and 20, the joint terminal 101 is mounted into the lower housing 107 from above and held while being prevented from coming out upward.

As shown in FIG. 19, the joint connector 100 is completed by assembling the upper housing 112 with the lower housing 107.

According to this embodiment, a coupling portion 118 includes the plurality of bent portions 114 bent to project in a direction intersecting a plate surface of the coupling portion 118, and the lower housing 107 includes a plurality of the partition walls 110 to be respectively resiliently engaged with the plurality of bent portions 114.

The bent portions 114 provided in the coupling portion 118 and the partition walls 110 provided in the lower housing 107 are respectively engaged, whereby the positions of the plurality of bent portions 114 in the lateral direction can be individually adjusted. In this way, the accuracy of pitch intervals between adjacent ones of the plurality of wire connecting portions 104 can be improved.

According to this embodiment, each of the plurality of wire connecting portions 104 includes the wire barrel portion 105 to be crimped to the core 13 of the wire 11.

In this way, the joint terminal 101 and the wires 11 can be connected by a simple method called crimping.

Other Embodiments (1) The joint terminal 12 can be formed with an arbitrary number of the wire connecting portions 17 such as two, five or more.

(2) The joint terminal 70 may be provided with two or more pitch adjusting bent portions 72B.

(3) The slide portion 16 may have any arbitrary shape such as polygonal tube shapes including a triangular tube shape and a hexagonal tube shape and hollow cylindrical shapes.

LIST OF REFERENCE NUMERALS

10, 100: joint connector
11: wire
12, 70, 80, 90, 101: joint terminal
13: core
14: insulation coating
15: terminal body
16: slide portion
17, 104: wire connecting portion
18A: upper sandwiching piece
18B: lower sandwiching piece
19, 71, 82, 92, 118: coupling portion
20, 102: branch portion
21, 81, 91, 114: bent portion
22: end engaging portion
23A: upper holding protrusion
23B: lower holding protrusion
24, 103R, 103L: locking wall portion
25A: upper contact portion
25B: lower contact portion
26: partial lock receiving portion
27: full lock receiving portion
28: locking projection
29: housing
30, 107: lower housing
31, 108: bottom wall
32, 109: side wall
33: locking recess
34: partition rib
35, 110: partition wall
36, 111: locking claw
45: jig
46: jig contact portion
47: guiding portion
48: pressing jig
49: intersecting wall portion
50: carrier
60, 112: upper housing
61, 113: upper wall
62: side wall
63: rear wall

64: escaping groove
65: wire draw-out opening
66: lock claw
67: coupling portion accommodating portion
68: escaping slit
72A: bent portion
72B: pitch adjusting bent portion
105: wire barrel portion (crimping portion)
106: insulation barrel portion
115: first rear stop portion
116: second rear stop portion
117: retraction recess

What is claimed is:

1. A joint connector for electrically connecting a plurality of wires, comprising:
a housing; and
a joint terminal disposed in the housing,
wherein:
the joint terminal includes:
a plurality of branch portions arranged along an arrangement direction;
a plurality of wire connecting portions respectively continuous with the plurality of branch portions and connected to the plurality of wires; and
a coupling portion configured to electrically connect the plurality of branch portions by coupling the plurality of branch portions,
the coupling portion has a plate shape extending in the arrangement direction and is bent, and
the coupling portion is formed by a single body and stretchable in its entirety in the arrangement direction to generate a resilient force, thereby being engaged with the housing.

2. The joint connector of claim 1, wherein:
the coupling portion includes a plurality of bent portions bent to project from a plate surface of the coupling portion, and
the plurality of bent portions include at least one pitch adjusting bent portion.

3. The joint connector of claim 1, wherein end engaging portions engaged with the housing are provided on both end parts of the coupling portion in the arrangement direction.

4. The joint connector of claim 1, wherein:
the coupling portion includes a plurality of bent portions bent to project from a plate surface of the coupling portion, and
the housing includes a plurality of individual engaging portions respectively resiliently engaged with the plurality of bent portions.

5. The joint connector of claim 1, wherein:
each of the plurality of wire connecting portions includes a terminal body having a plurality of sandwiching pieces for sandwiching the wire and a slide portion slidable with respect to the terminal body along an extending direction of the wire,
the slide portion has a tubular shape and the plurality of sandwiching pieces are accommodated inside the slide portion,
the slide portion includes a contact portion projecting inward from an inner wall of the slide portion and configured to press the plurality of sandwiching pieces toward the wire by coming into contact with the plurality of sandwiching pieces, and
the contact portion comes into contact with the plurality of sandwiching pieces when the slide portion moves to a contact position.

6. The joint connector of claim 5, wherein the terminal body includes an intersecting wall portion intersecting a sliding direction of the slide portion to the contact position on a front end part in the sliding direction.

7. The joint connector of claim 1, wherein each of the plurality of wire connecting portions includes a crimping portion crimped to the wire.

8. The joint connector of claim 2, wherein the pitch adjusting bent portion has a bent shape different from those of the other bent portions.

9. The joint connector of claim 1, wherein the coupling portion includes a plurality of bent portions each having a chevron shape when viewed from a front.

* * * * *